June 30, 1964  G. T. MOO  3,138,960
INFINITELY VARIABLE SPEED TRANSMISSION AND
DIFFERENTIAL DRIVE THEREFOR
Filed Dec. 27, 1960  12 Sheets-Sheet 1

INVENTOR.
GOTHARD T. MOO
BY *Salter + Michaelsen*
ATTORNEYS

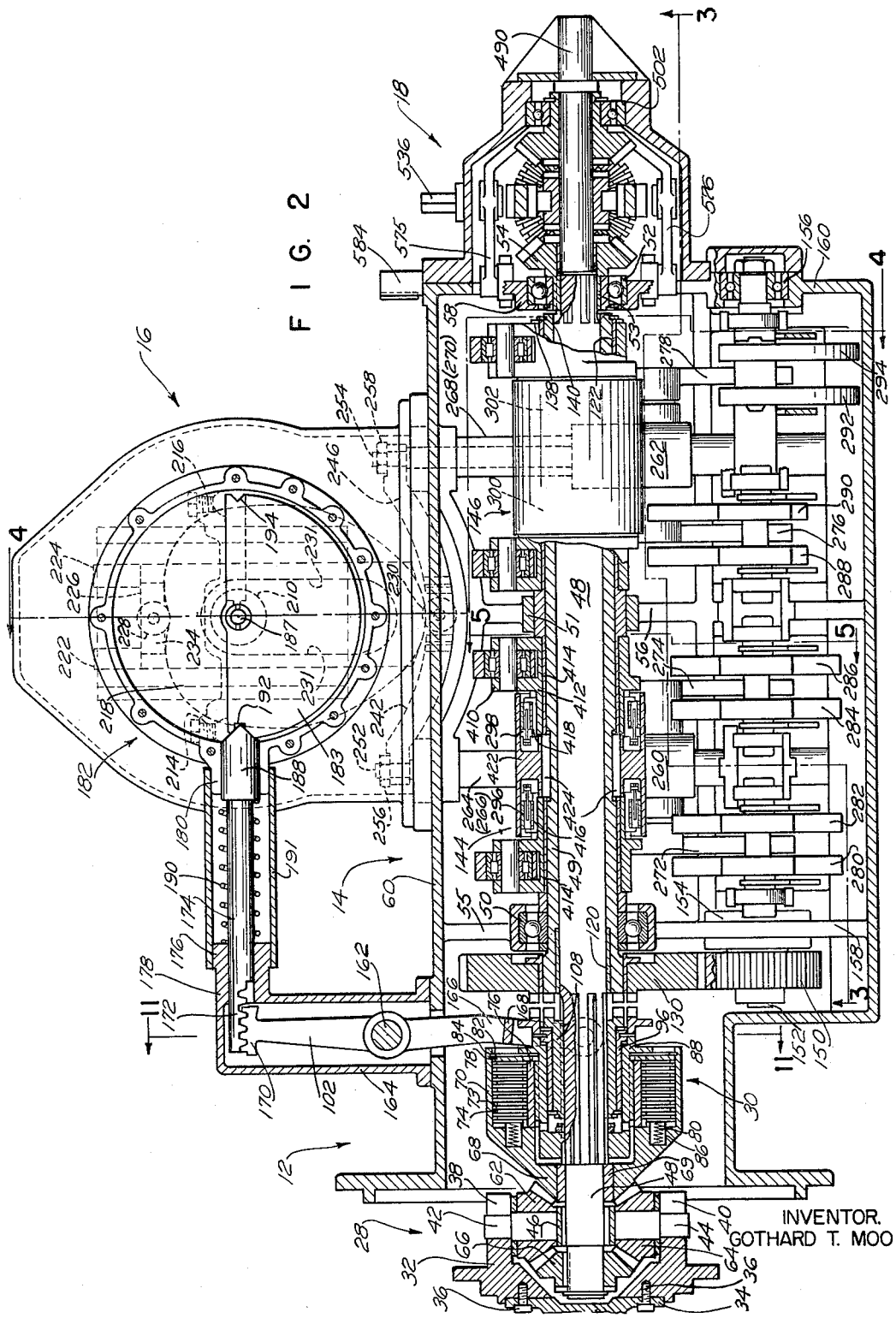

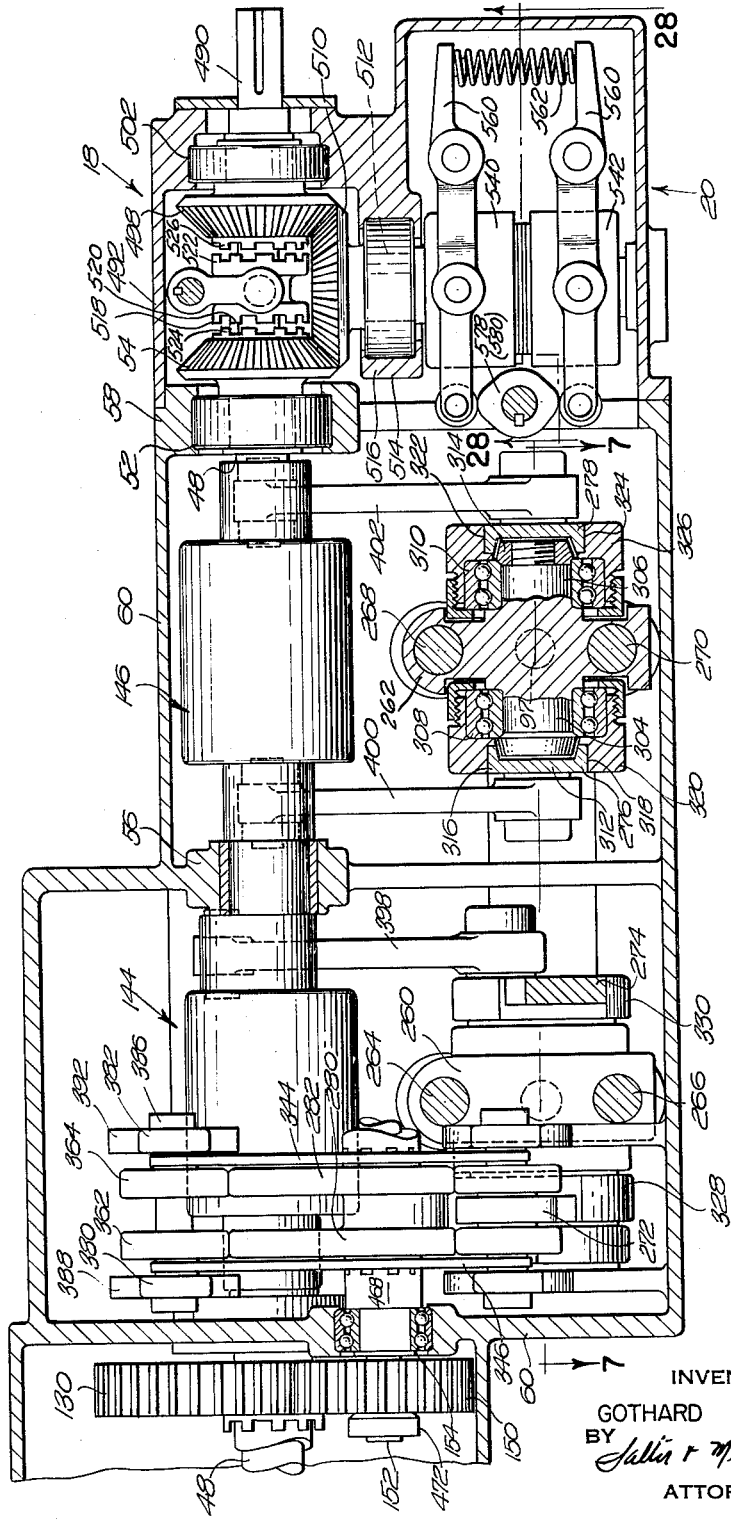

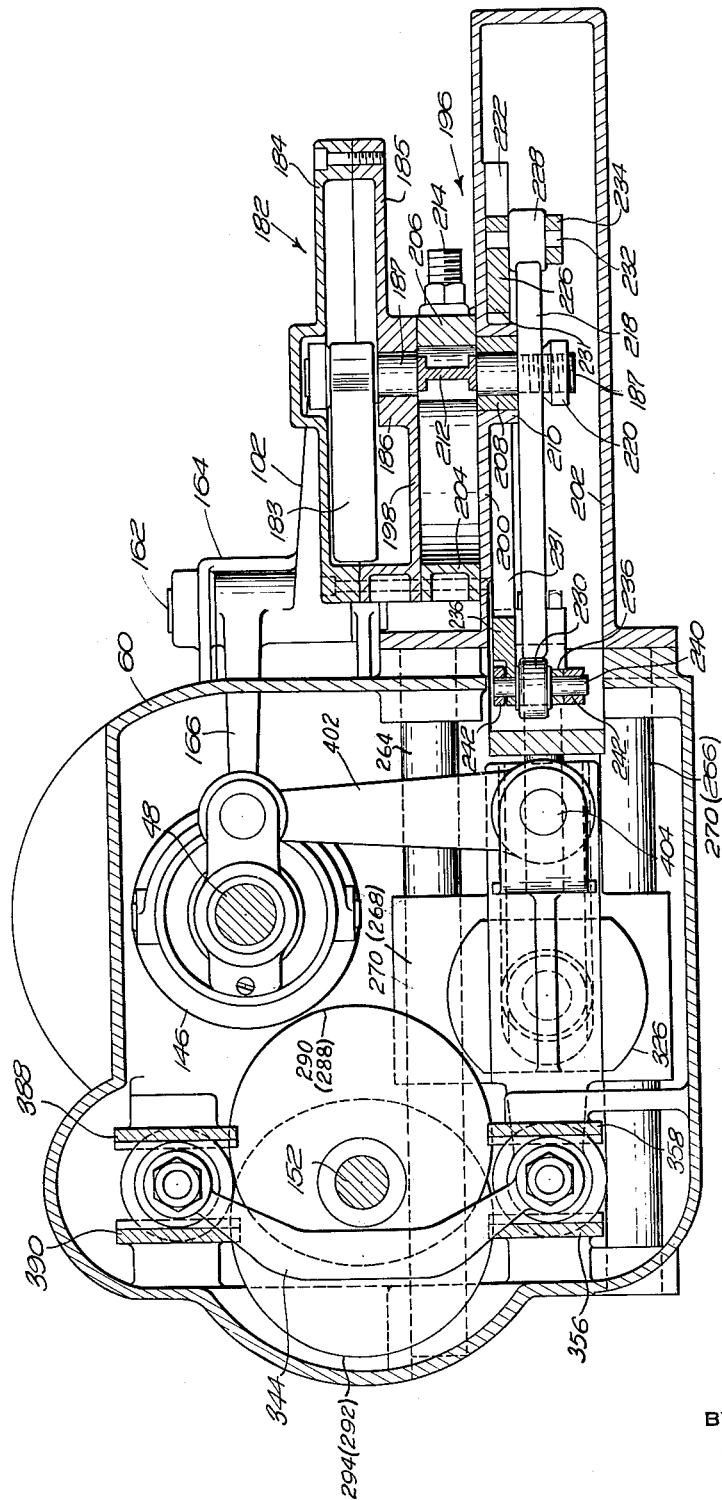

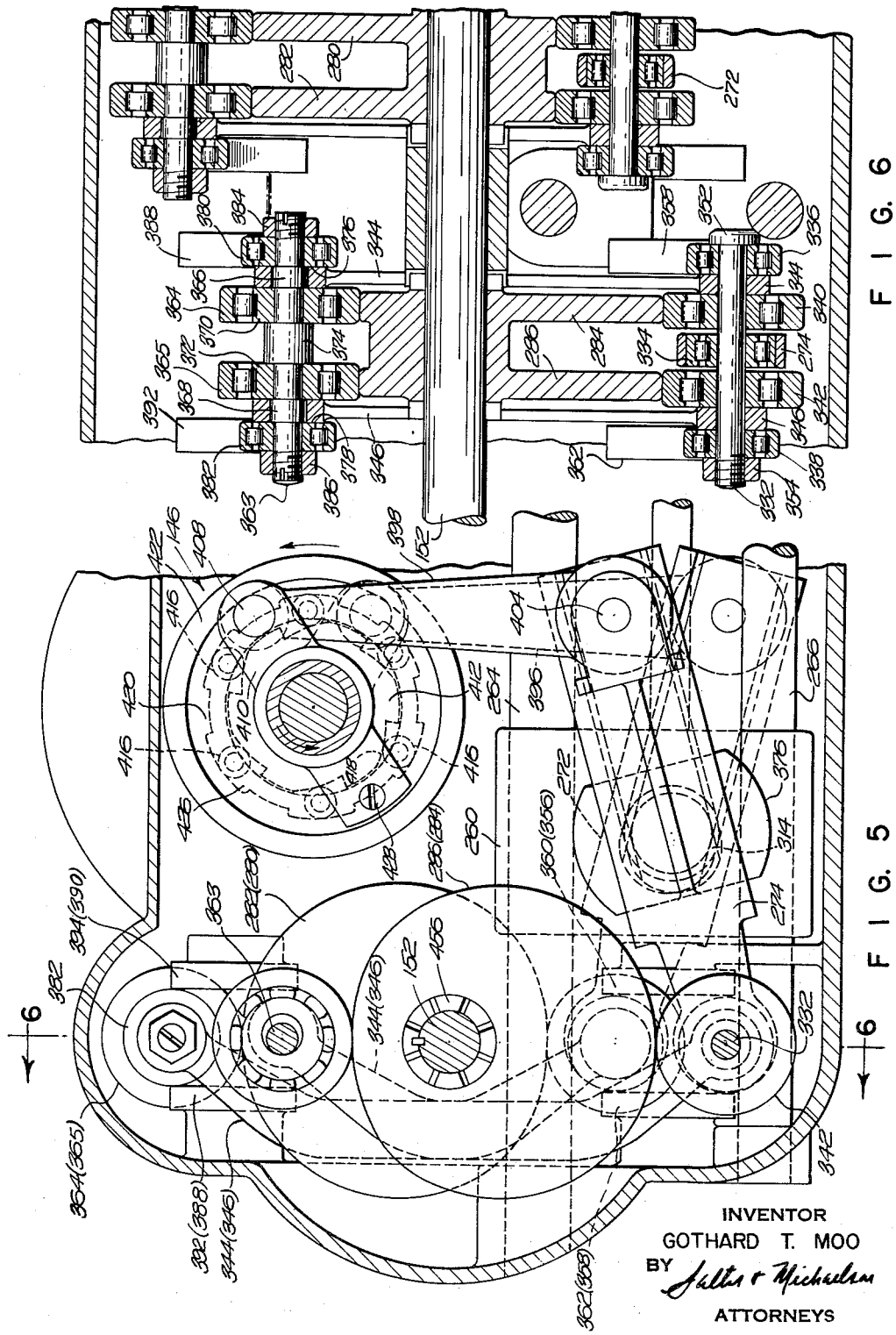

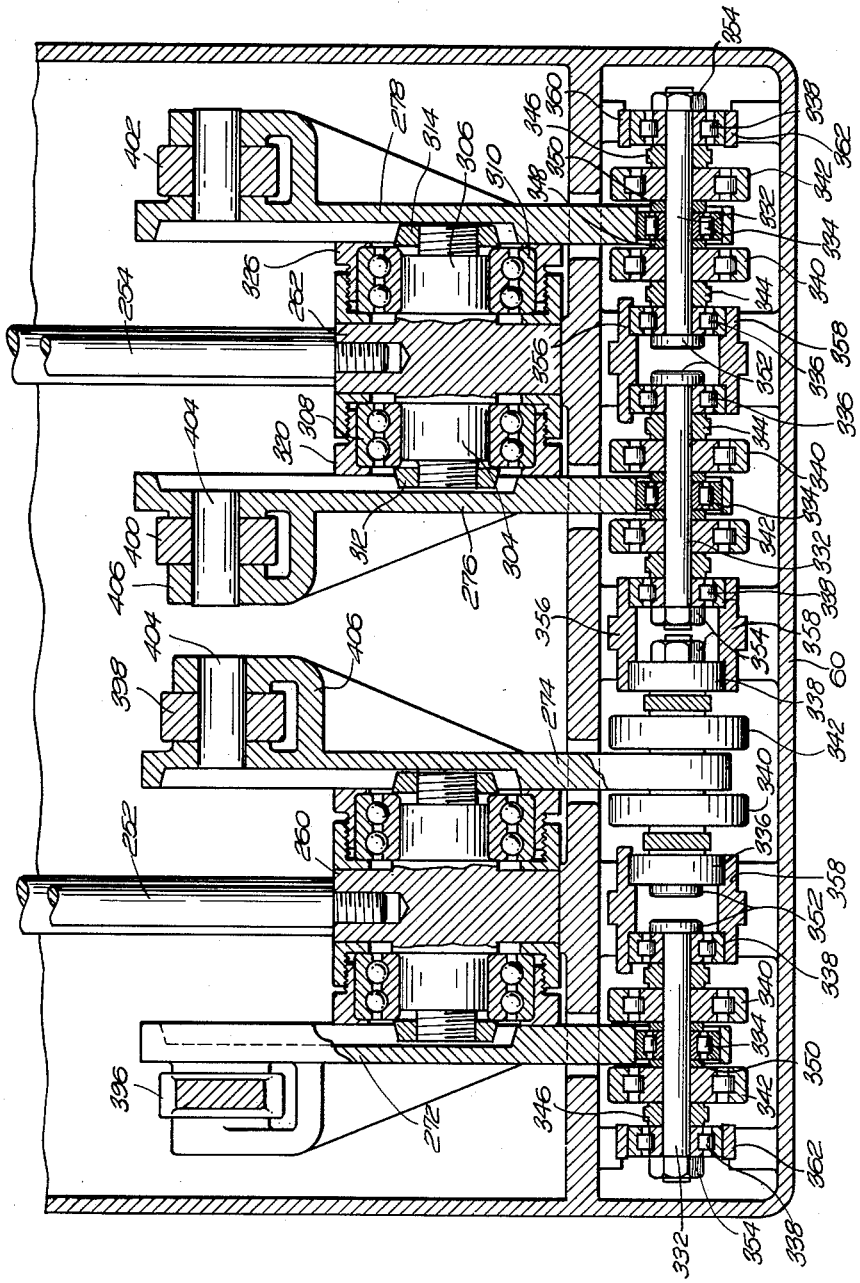

June 30, 1964 G. T. MOO 3,138,960
INFINITELY VARIABLE SPEED TRANSMISSION AND
DIFFERENTIAL DRIVE THEREFOR
Filed Dec. 27, 1960 12 Sheets-Sheet 8
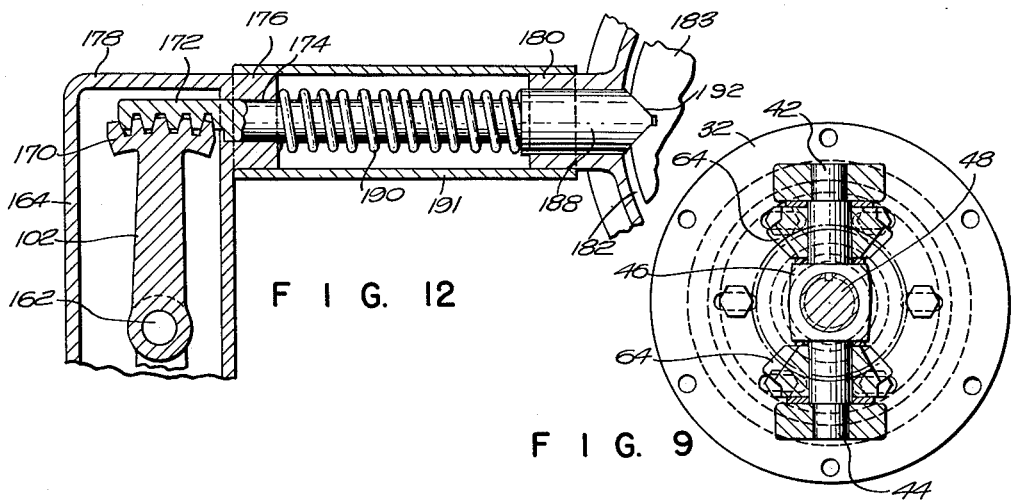
FIG. 12
FIG. 9
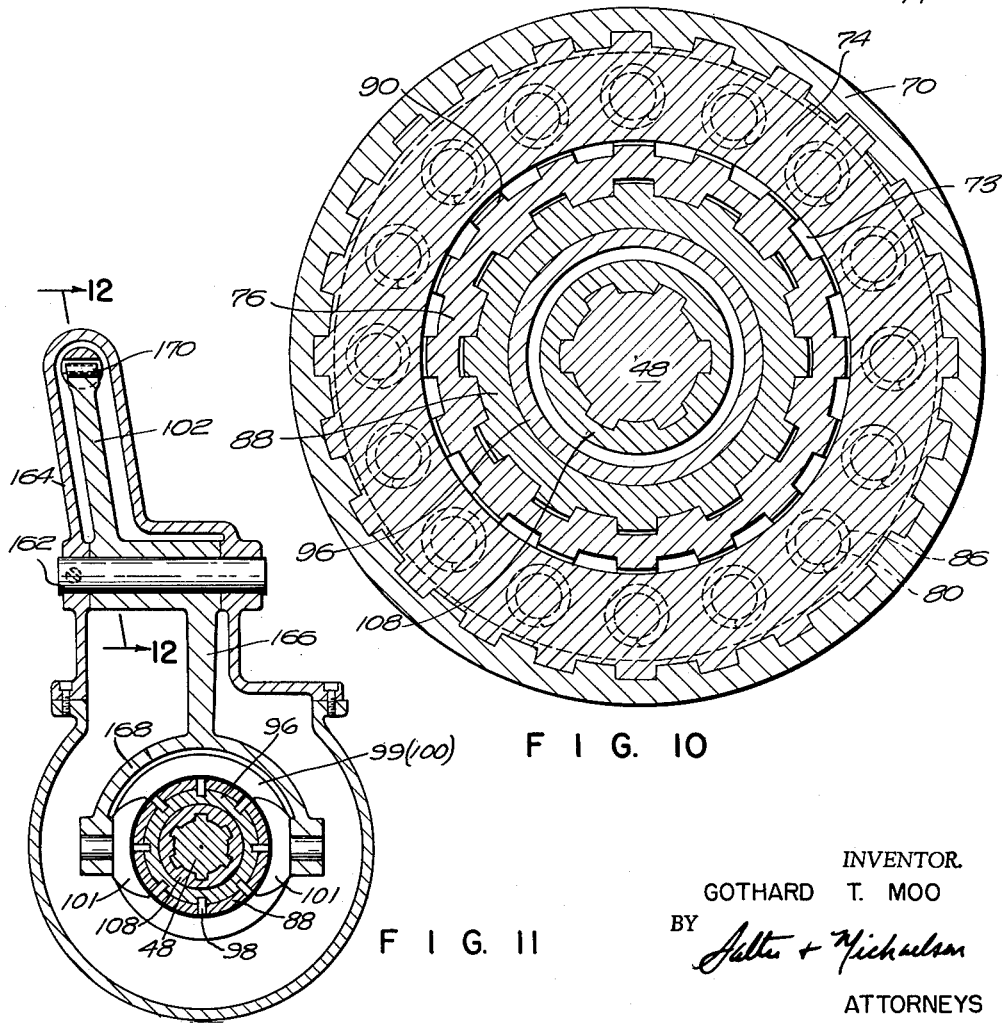
FIG. 10
FIG. 11
INVENTOR.
GOTHARD T. MOO
BY
ATTORNEYS

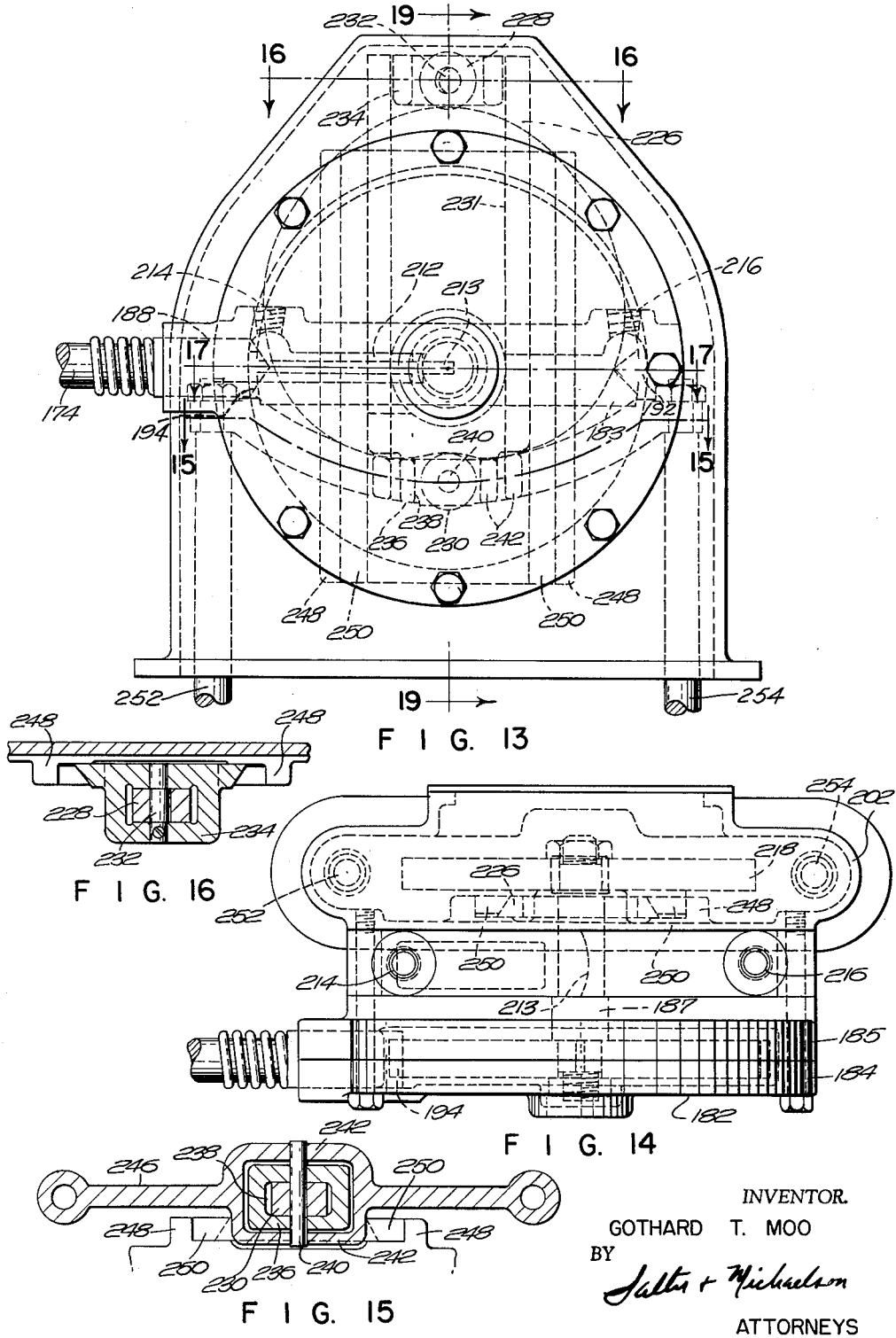

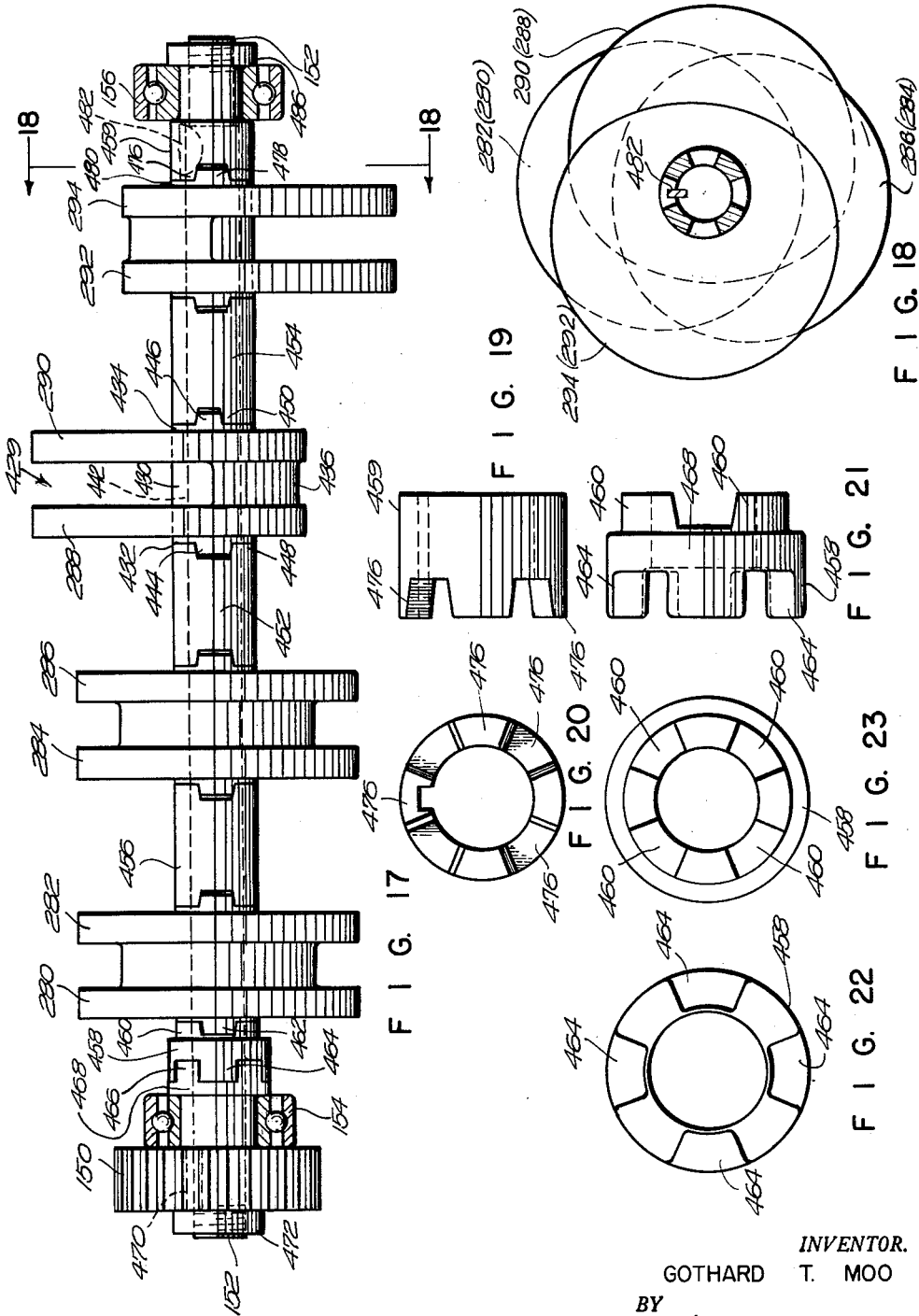

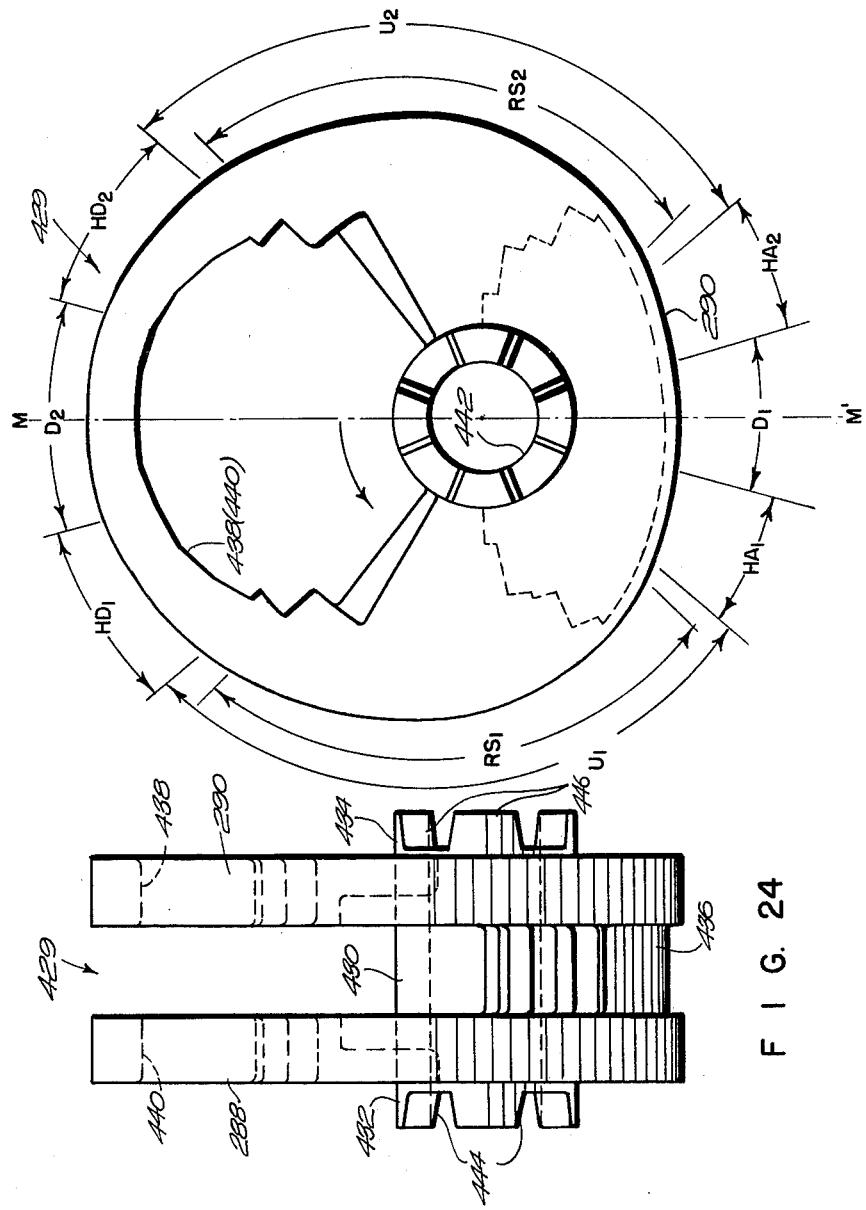

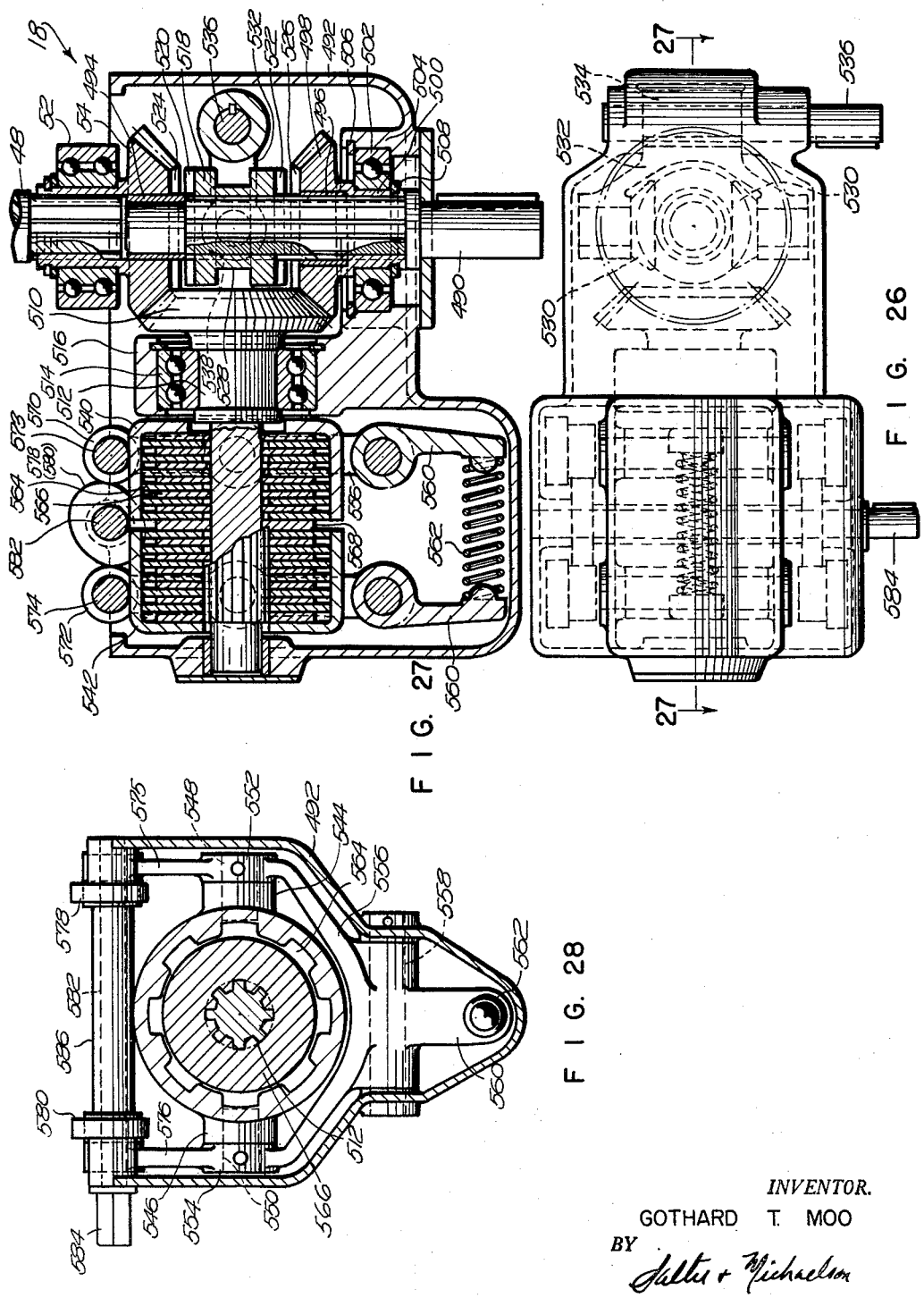

United States Patent Office 3,138,960
Patented June 30, 1964

3,138,960
INFINITELY VARIABLE SPEED TRANSMISSION AND DIFFERENTIAL DRIVE THEREFOR
Gothard T. Moo, Cranston, R.I., assignor to Weskenson Corporation, Cranston, R.I., a corporation of Rhode Island
Filed Dec. 27, 1960, Ser. No. 78,581
42 Claims. (Cl. 74—124)

The present invention relates to power transmitting mechanisms. More particularly, the present invention relates to a mechanical transmission that is infinitely variable and operable through a differential drive.

In connection with the power transmitting mechanism embodied herein, reference is made to Patents No. 2,448,386, dated August 31, 1948, and No. 2,892,522, dated June 30, 1959.

It is an object of the present invention to provide a power transmitting device that includes a four phase or more infinitely variable speed transmission that is adapted to transmit power from the power shaft of a prime mover to an output shaft, the transmission being controllable to gradually increase or decrease the speed of the output shaft between zero and a selected top speed, at which point the output shaft is directly coupled to the power shaft. In carrying out the object of the invention, the variable speed transmission is operatively connected to the power shaft through a differential drive, control means being provided and operable to adjust the variable speed transmission so as to bring the speed of the output shaft up to the speed of the power shaft. When maximum speed of the output shaft is attained, the variable speed transmission is automatically released from engagement with the power shaft and the output shaft is driven at maximum speed by the power shaft directly through the differential drive.

The control means is also operable to effect a gradual reduction of speed of the output shaft through the transmission, the reduction to zero speed being possible. In between maximum speed and zero speed of the output shaft, part of the power input from the output shaft is transmitted through the direct drive from the prime mover and part is transmitted through the differential and the variable speed transmission.

In the power transmitting mechanism embodied herein, the differential drive is arranged in such a manner that it may be operable to deliver torque to the main or output shaft through both the transmission and power shaft. One side of the differential is continuously connected to the output shaft, while the other side of the differential may be selectively connected to the output shaft by a clutch for effecting the direct drive of the output shaft. The other side of the differential is also adapted to be disconnected from the output shaft and connected to the transmission that produces the variable speed drive. Generally the variable speed drive transmission defines a four phase or more operating cycle and includes a cam shaft, separately movable oscillating levers driven by cams mounted on the cam shaft and a pair of overrunning clutch units secured to the output shaft, the overrunning clutch units being driven by the levers and being operated in phased relation. The cam shaft is driven by the differential through suitable gearing and a clutch which connects the gearing with the differential whenever a variable speed is desired.

The cams that are mounted on the cam shaft are constructed in a predetermined configuration that is designed to provide the necessary pivotal movement of the levers which in turn drive the overrunning clutches. The cams are further fixedly mounted on the cam shaft by clutch elements that are specifically designed to prevent backlash or other relative movement of the cams when the cams are in engaging relation with their respective followers.

The present invention also incorporates a reversing device that is designed to reverse the rotation of the output shaft when reversing is required, and, in addition, a braking mechanism is incorporated in the reversing device that provides for control of the rotation of the power shaft when it is operating under load.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part hereof, in which:

FIG. 2 is a horizontal sectional view of the variable speed transmission and the drive therefor;

FIG. 3 is a sectional view taken along lines 3—3 in FIG. 2;

FIG. 4 is a sectional view taken along lines 4—4 in FIG. 2;

FIG. 5 is a sectional view taken along lines 5—5 in FIG. 2;

FIG. 6 is a sectional view taken along lines 6—6 in FIG. 5;

FIG. 7 is a sectional view taken along lines 7—7 in FIG. 3;

FIG. 9 is a sectional view taken along lines 9—9 in FIG. 8;

FIG. 10 is a sectional view taken along lines 10—10 in FIG. 8;

FIG. 11 is a sectional view taken along lines 11—11 in FIG. 2;

FIG. 12 is a sectional view taken along lines 12—12 in FIG. 11;

FIG. 13 is an enlarged top plan view of the housing for the drive clutch operating cam and fluid motor drive therefor showing the cam slide in the outermost position thereof, wherein the drive clutch unit is located in neutral;

FIG. 14 is a side elevational view of the cam and fluid motor illustrated in FIG. 13;

FIG. 15 is a sectional view taken along lines 15—15 in FIG. 13;

FIG. 16 is a sectional view taken along lines 16—16 in FIG. 13;

FIG. 17 is a top plan view of the transmission cam shaft and the cams mounted thereon as seen in FIG. 2;

FIG. 18 is a sectional view taken along lines 18—18 in FIG. 17;

FIG. 19 is a side elevational view of the right hand clutch element for securing the transmission cams to the cam shaft;

FIG. 20 is an end view of the clutch element illustrated in FIG. 19;

FIG. 21 is a side elevational view of the left hand clutch element illustrated in FIG. 17;

FIG. 22 is an end view of the clutch element illustrated in FIG. 21;

FIG. 23 is an end view showing the opposite end of the clutch element illustrated in FIG. 21;

FIG. 24 is a plan view of one of the transmission cam members;

FIG. 25 is a side elevational view of the cam member shown in FIG. 24;

FIG. 26 is an end elevational view of the reversing and hold-back mechanism embodied herein;

FIG. 27 is a sectional view taken along lines 27—27 in FIG. 26; and

FIG. 28 is a sectional view taken along lines 28—28 in FIG. 3.

Figure 1:
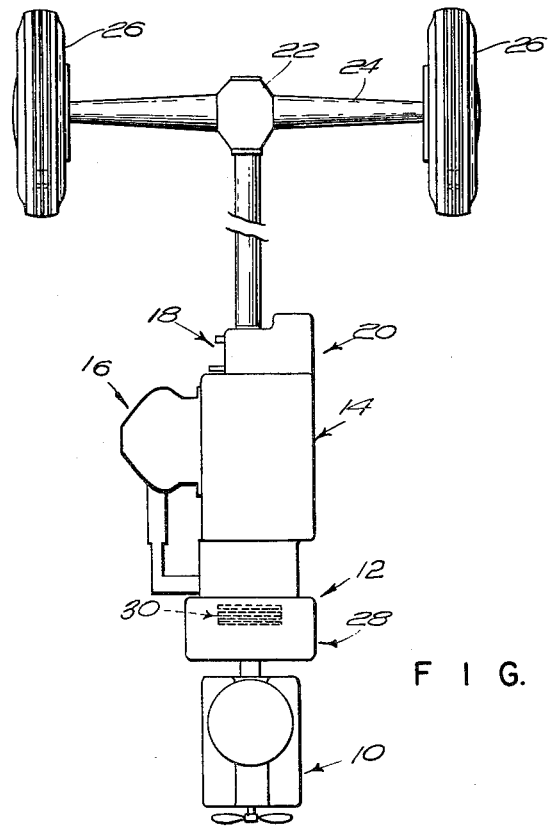
FIG. 1 is a diagrammatic illustration of an automotive vehicle showing the arrangement of components embodied in the present invention.

As illustrated in the drawings, the power transmitting mechanism embodied herein is constructed and arranged for driving an automotive vehicle; however, it is understood that the application thereof to other uses is contemplated.

Referring now to FIG. 1, the principal units of the invention as used in an automotive vehicle are illustrated in diagrammatic form and include an engine or prime mover 10, a combination differential drive and clutch unit 12, an infinitely variable speed transmission 14, a control mechanism 16 for controlling the clutch in the assembly 12, and for controlling the effective speed ratio of the variable speed transmission 14, a reversing unit 18 combined with a hold-back mechanism 20, a rear end unit including a conventional differential 22 and rear axles 24 on which are mounted wheels 26.

*The Differential Drive and Clutch Unit*

The purpose of the differential is to have two branches thereof drive the same output source. As will be apparent hereinafter one branch of the differential is connected directly to the output source at all times, while another branch is adapted to be clutched to the transmission unit 14. The second branch may be selectively disconnected from the transmission and connected directly to the output source together with the first branch. A still third branch of the differential is driven by the power source.

Figure 8:
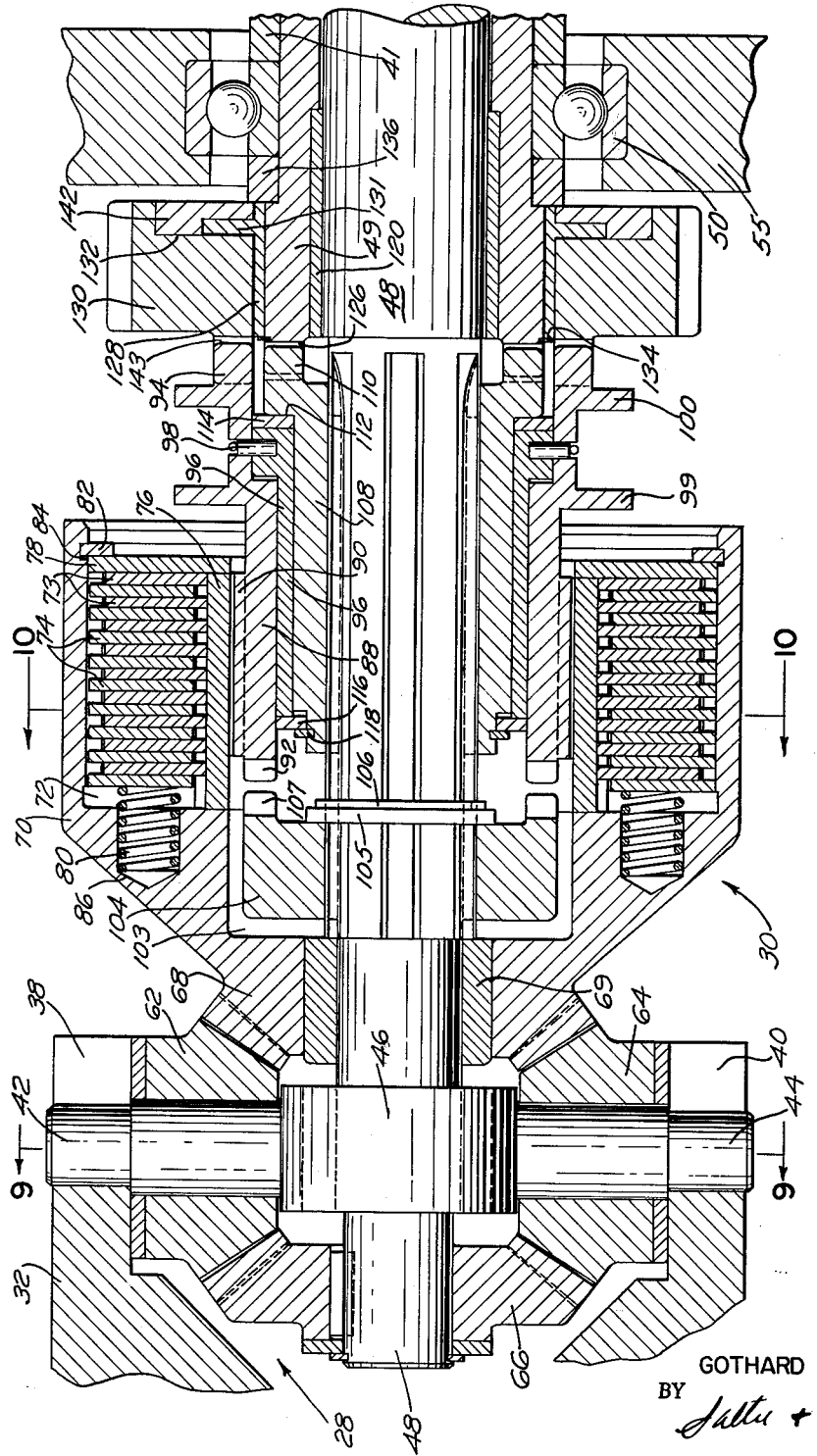
FIG. 8 is an enlarged view of the output shaft and the differential drive therefor including the drive clutch assembly.

Referring to FIGS. 2 and 8, the combination differential drive and clutch unit 12 is illustrated in detail, the differential drive being generally indicated at 28 and the clutch unit being generally indicated at 30. The differential drive 28 includes a driving dog 32 that is connected to a shaft 34 of the prime mover 10 by bolts 36. Formed in the driving dog 32 are opposed notches 38, 40, through which the outermost ends of radially extending stub shaft 42, 44 of a planetary gear carrier 46 project. The carrier 46 is mounted for rotation on a main or output shaft 48 that is journalled for rotation in a hollow elongated sleeve 49 as will be described hereinafter. A ball bearing assembly 50 and a center bearing 51 support the hollow sleeve 49 while an end ball bearing assembly 52 supports a hub 53 of a bevel gear 54 that is keyed to the outer end of the output shaft 48. As shown in FIG. 2, the bearing assemblies 50, 51 and 52 are mounted in supports 55, 56 and 58, respectively, that are formed integrally with and project inwardly from the walls of a housing 60 in which the component parts of the clutch unit 30 and the transmission 14 are located. Rotatably mounted on the stub shaft 42, 44 of the differential drive 28 are planetary gears 62 and 64, respectively, that are engaged on the forward side thereof by a sun gear 66 that is keyed to the output shaft 48 and on the rearward side thereof by another sun gear 68 that is mounted on a bushing 69 and that is formed integral with a clutch housing 70 of the clutch unit 30. The clutch housing 70 which defines an outer housing for the clutch unit 30 is formed with a central opening 72 in which a plurality of spaced annular discs 74 are located. The friction discs 74 have notches formed in the outer peripheries thereof that are engaged by splines extending along the interior surface of the clutch housing. The friction discs 74 are interleaved with similar discs 73 that have notches formed in their inner peripheries, the discs 73 in turn being engaged by splines formed on the outer surface of a sleeve 76. The clutch discs 73, 74 are adapted to be compressed into frictional engagement with each other between a circular end plate 78 and a plurality of springs 80. The plate 78 is retained in position by a retaining ring 82 that is located in an annular groove 84, while the springs 80 are disposed in spaced openings 86 formed in the clutch housing 70. It is seen that the complementary friction discs 73 and 74 define a safety device whereby in the friction discs 74 are capable of slippage with respect to the friction discs 73 in the event of shock between the differential gearing and the variable speed mechanism of the transmission 14.

The sleeve 76 is coaxially mounted on an outer axially movable clutch collar 88 through a spline connection 90, the clutch collar 88 having clutch teeth 92 and 94 formed on opposite ends thereof and being secured to a bushing 96 through keys 98. Formed on the clutch collar 88 are spaced flanges 99 and 100 between which shoes 101 of a control lever 102 (FIG. 2) are adapted to extend as will be hereinafter described. Secured to the shaft 48 and positioned in a recess 103 formed concentrically in the clutch housing 70 is a clutch element 104. The clutch element 104 is prevented from endwise movement by a washer 105 and a retaining ring 106 and has clutch teeth 107 formed thereon that are adapted to be engaged by the clutch teeth 92 of the clutch collar 88.

The bushing 96 is freely mounted in coaxial relation on an inner axially movable clutch element 108 that is provided with clutch teeth 110 on the inner end thereof. The clutch element 108 is adapted to be axially movable in response to movement of the bushing 96 with the clutch collar 88, and for this purpose is formed with a shoulder 112. A washer 114 is disposed in engaging relation with the inner end of the bushing 96 and the shoulder 112 and transfers the inwardly directed axial movement of the bushing 96 to the clutch element 108. A washer 116 and a thrust ring 118 engage the outer ends of the bushing 96 and the clutch element 108 and are adapted to transfer the outwardly directed axial movement of the bushing to the clutch element 108.

Mounted in the hollow sleeve 49 are bearing members 120 and 122 in which the shaft 48 is mounted for rotation. Secured to the hollow shaft 49 are clutch teeth 126 that are adapted to engage clutch teeth 110, thereby interengaging the clutch element 108 with the hollow shaft 49. Mounted freely on the hollow shaft 49 through a bushing 128 is a transmission drive gear 130 that is adapted to transfer the drive from the differential and clutch unit 12 to the infinitely variable transmission 14. The bushing 128, which includes an annular flange 131 that extends into a groove 132 in the gear 130, is retained against endwise movement by a thrust ring 134 and a washer 136, while a washer 138 and a thrust ring 140 are provided on the outer end of the hollow shaft 49 for preventing endwise movement thereof in an outward direction. A disc 142 is secured in the groove 132 in the gear 130 in engaging relation against the flange 131 and acts to retain the gear 130 in position. Formed on the gear 130 are clutch teeth 143 that are adapted to be engaged with the teeth 94 on the clutch collar 88. As shown in FIG. 2, the transmission 14 is adapted to drive a pair of roller drive clutch units generally indicated at 144 and 146 which are keyed to the hollow shaft 49 and transfer reciprocating motion into rotary motion thereto. The transmission structure and the drive for the clutch units 144, 146 will be described in detail hereinafter; however, it is pointed out here that the roller drive clutch units are illustrated and described in detail in Patent No. 2,892,522 hereinabove mentioned.

In operation of the clutching mechanism, the clutch collar 88 is adapted to be axially moved with the clutch element 108 through the bushing 96 by the control lever 102, and upon movement to the right as seen in FIG. 8, the teeth 94 will engage the teeth 143 of the gear 130. Since the gear 130 is adapted to drive the transmission cam shaft, to be described, the roller drive clutch units 144 and 146 will be oscillated, which movement is translated into rotary movement of the hollow shaft 49. Since the hollow shaft 49 is in driving engagement with the clutch element 108 through teeth 126 and 110, the drive is transferred to the output shaft 48. It is seen that during the transmission of power through the variable speed transmission 14 to the output shaft 48, part of the power is applied thereto through the sun gear 68, clutch unit 30 and the gears 130 and 150. An equal amount of power is also applied to the output shaft 48 through the driving dog 32, planet carrier 46, planetary gear 62 and the sun gear 66. Since the power requirement for the transmission itself is only one-half the amount normally expected the efficiency of the transmission is greatly increased. When the clutch collar 88 is moved to the left as seen in FIG. 8, the gear 130 and hollow shaft 49 are disengaged from the drive from the clutch sleeve 76 and the drive is then transferred to the clutch element 104 through the engaging clutch teeth 92 and 107. Since the clutch element 104 is secured directly to the output shaft 48, the differential gear drive 28 will drive directly through the clutch housing 70 to the output shaft 48. Thus the output shaft 48 will be rotated in direct drive and will be divorced from driving engagement with the transmission 14 and roller drive clutch units 144, 146. The engagement of the clutch collar 88 with the clutch member 104 has the effect of locking the sun gear 68 to the shaft 48, wherein the differential drive including the planet gears 62, 64 and the sun gears 66, 68 rotate as a unit with the dog 32 and the drive shaft 34.

As mentioned hereinabove, the variable speed transmission 14 is adapted to adjust the speed of the output shaft 48 from zero to a maximum corresponding to the speed of the drive shaft 34. Referring particularly to FIG. 2, the variable speed mechanism is shown including a gear 150 that is secured to a secondary or cam shaft 152 and that is disposed in meshing relation with the gear 130. The cam shaft 152 is journalled for rotation in bearings 154 and 156 carried by supports 158, 160, respectively, and is located in parallel relation with respect to the output shaft 48. It is understood that whenever the clutch collar 88 is shifted into clutching engagement with the gear 130, the power applied to the sun gear 68 is transmitted to the cam shaft 152.

*The Control Mechanism*

In order to shift the clutch collar 88 axially to engage the clutch unit 30 either with the gear 130 or the main shaft 48, depending on the required conditions, the control lever 102 is provided and is pivotally mounted on a shaft 162 carried by a secondary housing 164 that is secured to the main transmission housing 60. Secured to the control lever 102 is an arm 166 on the lower end of which a fork 168 is formed (FIG. 11). The fork 168 straddles the clutch collar 88 and carries the shoes 101 that project into the annular groove defined by the flanges 99 and 100. While the lever 102 may be manually operated in some embodiments of the invention, in the application of the invention to automotive use, the lever 102 will be automatically operated in order to axially shift the clutch collar 88 whenever the driving conditions require changing from a variable speed drive of the main shaft 48 to a direct drive thereof, or vice versa. As shown in FIGS. 2 and 12, the lever 102 is formed with a gear sector 170 on the outermost end thereof that engages a rack 172 formed on one end of a shift rod 174. The shift rod 174 is mounted for axial movement in a boss 176 formed in an extension 178 of the housing 164 and in a boss 180 that is formed as part of a segment cam housing generally indicated at 182. The segment cam housing 182 has a segment plate cam 183 mounted for oscillating movement therein and is defined by abutting sections 184 and 185 (FIG. 4), the section 185 being formed with a boss 186 through which a shaft 187 extends in bearing relation therewith. As best seen in FIG. 4, the shaft 187 extends into the interior of the housing 182, the segment cam 183 being secured thereto. Secured to the inner end of the shift rod 174 is a follower member 188 that is normally urged into contact with the periphery of the segment cam 183 by a spring 190, the spring 190 encircling the shift rod 174 and being compressed between the follower member 188 and the boss 176. A tubular sleeve 191 frictionally engages the bosses 176 and 180 and encloses the encircling spring 190 and the central portion of the shift rod 174.

The segment cam 183 which is adapted to be oscillated in accordance with the torque and speed requirements of the main shaft 48, as will be described hereinafter, is provided with notches 192 and 194 at diametrically opposite points on the periphery thereof, the notch 192 being somewhat more deeply cut in the cam periphery than the notch 194. It is seen that either of the notches 192, 194 is adapted to receive the reduced end of the follower member 188 therein, depending upon the position of the segment cam 183. When the cam 183 is located in the position as shown in FIGS. 2 and 12, the follower member 188 is received by the larger notch 192, whereupon the shift rod 174 is shifted to the right, causing the lever 102 to move the clutch collar 88 to the left. This movement causes the teeth 92 on the clutch collar 88 to engage the teeth 107 on the clutch element 104 whereby a direct drive to the main shaft from the power shaft 34 is effected. When the segment cam 183 is oscillated 180 degrees to cause the follower member 188 to be received in the shallower notch 194, the clutch collar 88 will be moved to the right, as seen in FIG. 2, out of engagement with the clutch element 104 and will remain intermediate the clutch element 104 and the gear 130 and hollow shaft 49. This defines the neutral position of the device. (See FIG. 13.) When the follower member 188 rides on the periphery of the segment portion of the cam 183, the shift lever 174 is forced further to the left, as seen in FIG. 2, thereby causing the lever 102 to move the clutch collar 88 into engagement with the gear 130, which movement also forces the clutch element into engagement with the hollow shaft 49. In this position, the cam shaft 152 of the variable speed transmission is in operating condition for transmitting power to the main shaft 48.

In order to oscillate the segment cam 183, a vane motor generally indicated at 196 is provided and includes a fluid-tight chamber, one side of which is defined by an offset bottom wall 198 of the segment cam housing 182 (FIG. 4). The bottom wall of the vane motor housing is defined by a portion 200 that is formed as part of a hollow extension 202 that is mounted on and attached to the main housing 60. A semi-circular side wall 204 is secured between the walls 198 and 200 while a side wall 206 spaced from the side wall 204 is secured between the boss 186 and the bottom wall 200. The shaft 187 extends through the vane motor housing and is supported in a bearing 208 that is carried by a boss 210 formed on the wall 200 of the extension 202, the shaft 187 terminating interiorly of the extension 202. A vane 212 is mounted for sliding movement in the shaft 187, and for this purpose the shaft is formed with a radial slot 213 (FIG. 14) through which one end of the vane 212 extends. The sides of the vane 212 are tapered and diverge toward the free end thereof, the free end of the vane being maintained in continuous abutting relation against the semicircular wall 204 by the pressure of the operating fluid that is introduced into the vane motor housing through either port 214 or port 216 (FIGS. 2 and 14). The vane 212 and the shaft 187 are movable through an angle of 180 degrees and are retained in an adjusted position in accordance with the pressure differential that is impressed on the vane. It is understood that the pressure of the fluid introduced into the vane motor housing may be controlled manually or automatically. The automatic control may be in a response to a centrifugal governor throttle control or a torque control as is well known in the art. It is seen that upon movement of the vane 212 in response to fluid pressure thereon, the shaft 187 will be rotated to rotate the segment cam 183. As hereinabove described, the lever 102 will be shifted in accordance with the position of the cam 183 and thus the operation of the transmission 14 may be controlled by controlling the introduction of the operating fluid into either port 214 or 216 of the fluid motor 196.

The fluid motor 196 not only controls the operation of the segment cam 183 but also controls the operation of the roller drive clutch units 144 and 146 so that as the vane 212 is rotated in accordance with the fluid pressure applied thereto, the driving motion applied by the roller drive clutches to the shaft 48 will be varied accordingly. Thus the speed ratio of the variable speed transmission 14 may be controlled in accordance with the angular position of the vane 212 at any given instant.

Referring again to FIGS. 2 and 4, the shaft 187, as shown, has a control cam 218 on the lower end thereof, the control cam 218 being retained in position within the extension 202 by a nut 220. Attached to the underside of the bottom wall 200 of the vane motor 196 are parallel guide members 222 and 224 which support a cam slide 226 on which spaced cam engaging rollers 228 and 230 are mounted. A slot 231 is formed in the cam slide 226 and provides for entry of the hub 210 and shaft 187 into the interior of the hollow extension 202. As shown in FIG. 16, the roller 228 is secured to an eccentric portion of a pin 232 that is mounted in a rectangularly shaped frame portion 234 on the outer end of the cam slide 226, the roller 228 being positioned within the frame portion 234. Referring to FIGS. 4 and 15, the inner end of the cam slide 226 is shown being formed with a rectangular frame 236 having a central opening 238 which receives the roller 230. A pin 240 extends through the frame 236 and the roller 230, thereby securing the roller 230 in position and further extends through spaced arms of a central yoke portion 242 that is formed integral with an arcuate shaped cross bar 246. The rollers 228 and 230 are thus spaced and located so as to constantly and simultaneously engage the periphery of the cam 218. As shown more clearly in FIGS. 13, 15 and 16, the cam slide 226 is mounted in ways 248 that are formed in the casing 202 and is held in position by gibs 250 that extend the length of the ways 248.

*The Variable Speed Transmission*

The transmission unit 14 is adapted to be driven by the differential as described above and is operably connectable to the output shaft 48 to control the speed thereof from zero to the speed of the power shaft. As will be described below the transmission unit is controlled by the operation of the vane motor 196 so as to control the speed of the output shaft 48 as desired.

Referring again to FIG. 2, the arcuate cross bar 246 that is movable with the slide 226 is shown secured to spaced rods 252 and 254 at the outermost ends thereof by nuts 256 and 258, respectively. The rods 252, 254 are secured in cross heads 260 and 262, respectively, which are mounted for sliding movement on guide rods 264, 266 and 268, 270 that are rigidly secured to the housing 60. As will be more fully described hereinafter, the cross heads 260, 262 define fulcrums for pivotally supporting working beams or oscillating levers 272, 274, 276 and 278. The working beams are responsive, respectively, to movement of four pairs of cams which are shown in FIGS. 2 and 17 as mounted on the cam shaft 152 and are identified as 280–282, 284–286, 288–290 and 292–294. The working beams 272 and 274 are adapted to actuate one-way roller clutches 296 and 298 that define the roller clutch unit 144 while the working beams 276 and 278 are adapted to actuate one-way roller clutches 300 and 302 that define the roller clutch unit 146. As hereinabove described, the roller clutch units 144 and 146 are operatively connected to the output shaft 48 through the hollow shaft 49 for imparting a driving motion thereto, the clutch units translating reciprocating motion of the working beams into rotary movement of the main shaft. The phase relationship of the cams is such that each pair of cams drives a one-way clutch and the main shaft 48 during at least one quarter of a revolution of the cam shaft 152 with the respective pairs of cams operating similarly in successive quarter revolutions of the cam shaft. As will be more apparent hereinafter, the positions of the cross heads 260, 262 as they are moved on the guide rods 264, 266 and 268, 270 determine the speed ratio between the cam shaft 152 and the main shaft 48 when the variable speed transmission 14 is in operation.

As shown in FIG. 3, the working beams 272 and 274 are pivotally supported on the cross head 260, while the working beams 276 and 278 are pivotally supported on the cross head 262. Since the cross heads 260 and 262 are constructed similarly, and since the working beams pivoted on their respective cross heads are similarly constructed, as also are their associated members, a full understanding of the operation of all of the working beams may be had from a description of the construction of one pair of the working beams and associated parts. As best seen in FIG. 3, the cross head 262 has a pair of trunnions 304 and 306 extending laterally from opposite sides of the cross head. Bearings 308 and 310 are mounted on the respective trunnions 304 and 306 and are held thereon by nuts 312 and 314, respectively. The working beam 276 is slidably mounted between parallel guide surfaces 316 and 318 formed in a guide block 320 that is rotatably supported by the bearing 308, while the working beam 278 is slidably mounted between parallel guide surfaces 322 and 324 formed in a guide block 326 that is rotatably supported by the bearing 310. It is understood that the cross head 260 and guide blocks 328 and 330 in which the working beams 272 and 274 are slidably mounted are constructed similarly to cross head 262 and guide blocks 320 and 326.

The input or cam ends of the four working beams 272, 274, 276 and 278 are all similarly guided and actuated by their respective pairs of cams. For example, in FIG. 7, the working beam 278 is shown carrying a pin 332 that is mounted in a bearing 334. Guide rollers 336 and 338 are rotatably mounted on the pin 332 adjacent the ends thereof, and cam followers or rollers 340 and 342 are rotatably mounted on the pin 332 on both sides of the working beam 278. The cam followers 340, 342 engage the underside of the actuating cams 292, 294, while the inner races of the bearings for the cam followers 340 and 342 are spaced apart from the guide rollers 336, 338 by links 344 and 346, respectively. Suitable washers 348 and 350 space apart the bearing 334 from the cam followers 340 and 342, and the roller assembly is held together by a head 352 at one end of the pin and a nut 354 at the other end thereof.

The guide rollers 336 and 338 are adapted to be moved vertically in response to the movement of the cam followers 340, 342 as they follow the periphery of the cams 292 and 294, respectively. In order to guide the movement of the guide rollers 336 and 338, opposed tracks 356, 358 and 360, 362 respectively, are provided and define trackways between which the rollers move. The tracks 356, 358 and 360, 362 are secured in the transmission housing 60, the tracks 356 and 358 defining a double trackway for receiving corresponding guide rollers that are movable in response to rotation of the cams 288 and 290. Since the guide roller and cam follower structures that are responsive to the other pairs of cams are constructed similarly to those just described in connection with cams 292, 294, similar reference numerals are applied to similar parts. Thus, in FIG. 7, for example, all of the corresponding guide rollers, cam followers, links and tracks are numbered the same, even though they are responsive to the operation of the different pairs of cams and affect the operation of different working beams.

Referring now to FIGS. 5 and 6, the upper ends of the links 344 and 346 for use with cams 284 and 286 are illustrated, together with the means for fastening the upper link ends in the assembly. As shown in FIG. 5, the links 344 and 346 are bowed and extend upwardly from their pin 332, the bowed configuration permitting the central portion of the links to be offset with respect to the cam shaft 152. Extending through the upper ends of the links 344, 346 is a roll pin 363 that also carries spaced cam followers 364 and 365 that are located opposite the cam rollers 340 and 342 diametrically across the cams 284, 286. In order to initially adjust the distance between the opposite pairs of the cam rollers, so that both pairs of cam rollers will be in engagement with the cams, the upper ends of the links 344, 346 are bored to receive eccentric portions 366 and 368 formed on the roll pin 363. The inner sides of the links 344 and 346 engage the inner races 370 and 372 of the bearings for the cam rollers 364, 365, while the other sides of the roller inner races are engaged by shoulders of an enlarged central portion 374 formed on the roll pin 363. The outer sides of the links 344 and 346 engage the inner races 376 and 378 of the bearings for guide rollers 380 and 382, respectively. The roll pin 363 is clamped to the links 344, 346 by tightening opposed nuts 384 and 386 as the pin is held in the adjusted position with a screw driver engaging a slot formed in one of the ends of the pin. A pair of tracks 388 and 390, which are supported by the housing 60 directly above the lower tracks 356 and 358, guide the roller 380, while a pair of similar tracks 392 and 394, which are supported by the housing directly above the lower tracks 360, 362, guide the roller 382. Since the working beams 272, 274, 276 and 278 are each pivotally connected to their respective pins 332 through the bearings 334, they derive their motions from their respective cams by similarly constructed and guided links and upper and lower roller assemblies.

The output ends of the working beams 272, 274, 276 and 278 are adapted to actuate the driving members of the one-way clutches 296, 298, 300 and 302, respectively, and are pivotally connected thereto through links 396, 398, 400 and 402, respectively. The connections between the working beams and their respective one-way clutches are similar, and each may be understood from a detailed description of one of these assemblies. Referring to FIGS. 2, 3, 5 and 7, the link 398 is shown pivotally connected to the working beam 274, by a pin 404 that is carried by a yoke 406 (FIG. 7). The other end of the link 398 is pivotally connected by a pin 408 to a bifurcated lever arm 410 (FIG. 2) which extends outwardly from the hub of an inner clutch member 412, the inner clutch member 412 being mounted for rotation on a bearing sleeve 414 that surrounds the hollow shaft 49.

The construction of the roller clutch units 144, 146 is described in detail in Patent No. 2,892,522, but for purposes of illustration herein, each one-way clutch comprising a part of each unit includes a plurality of rollers 416 that are circumferentially distributed around the clutch opposite a like number of cam surfaces 418 formed on the inner clutch member 412. As shown in FIG. 5, each roller 416 is positioned between a cam surface 418 and a circumferentially extending continuous clutch surface 420 that is formed on an outer clutch member 422. The outer member 422 of the clutch is secured to the hollow shaft 49 by a key 424, and the rollers 416 are retained between the inner and outer clutch members by a cage 426 that is secured to the inner clutch member by a screw 428 (FIG. 5). As described above and illustrated in FIG. 2, the outer member 422 of the clutch 298 also forms the outer member of the clutch 296, the two adjacent clutches being mirror likenesses of one another and defining the complete roller clutch unit 144. However, it is understood that the clutches 296 and 298 may be individually secured to the hollow shaft 49 if desired. The clutches 300 and 302 are constructed similarly to the clutches 296 and 298, respectively, and they also are similarly connected for actuation by their respective working beams 276 and 278.

As hereinabove explained, in the operation of the transmission 14 the position of the cross heads 260 and 262 along the guide rods 264, 266 and 268, 270, respectively, determines the ratio of speed transmission. When the segment cam 183 that is secured to the fluid motor shaft 187 is in the position illustrated in FIG. 2, the cross heads 260 and 262 are in the position for transmission of maximum speed. As the segment cam 183 is rotated from the position shown in FIG. 2, the speed ratio between the drive shaft 34 and output shaft 48 gradually decreases until the highest portion of the cam 183 has come opposite the roller 228, whereupon the slide 226 has moved the rods 252 and 254 together with the cross heads 260 and 262 to their most extreme position in the opposite direction. In this position of the cross heads, the centers of oscillations of the working beams 272, 274, 276 and 278 are aligned with their respective pins 404 on the output ends of the working beams, so that as the cam shaft 152 rotates, the several working beams oscillate about an axis coincident with the centers of the pins 404 and therefore do not impart any motion to the driving members of their respective one-way roller clutch units. With this condition prevailing, the roller clutch units 144 and 146 do not transmit power to the output shaft 48.

*The Cam Construction and Assembly*

In order to provide for a completely balanced operation of the output shaft 48, the present invention includes a four phase structure that is defined by the four cam pairs 280–282, 284–286, 288–290 and 292–294, and their associated working beams and roller drive clutches. It is understood, however, that the transmission may be designed for more than four phases, the number of phases depending on the transmission requirements.

The clutches 296, 298, 300 and 302 are adapted to successively impart driving torque to the main shaft 48, and, accordingly, the four pairs of clutch operating cams 280–282, 284–286, 288–290 and 292–294 are mounted on the cam shaft 152 in a phase relationship to provide like movements of their respective working beams and associated clutches at intervals of at least 90° of rotation of the cam shaft 152, which relationship is best seen in FIG. 17.

Referring now to FIGS. 24 and 25, a set of the cams are shown and for purposes of illustration are arbitrarily indicated as cams 288 and 290 that define a cam member generally indicated at 429. It is understood, of course, that the remaining cam members are constructed similarly to that illustrated and described in FIGS. 24 and 25. Cams 288, 290 which define the cam member 429 are formed from a single piece of metal and include a common hub 430 having bosses 432 and 434, a weight 436 being formed integral with the hub 430 and being located opposite the larger lobes of the cams. As shown in FIG. 25, the cams 288, 290 are formed with openings 438, 440, respectively, the weight 436 and the openings 438, 440 being arranged so as to dynamically balance the cam 429 about the axis of rotation thereof. The hub 430 is provided with a smooth bore 442 for frictionally engaging the cam shaft 152, while the bosses 432 and 434 have notches formed therein, that define wedge-like or truncated teeth 444 and 446 respectively.

The cam members are secured to the cam shaft 152 in a unique manner that is adapted to eliminate any backlash that would normally result during the operation of the transmission unit. As shown in FIG. 17, the teeth 444 and 446 of the cam member 429 engage corresponding teeth 448 and 450 formed in the ends of collars 452 and 454, respectively, that are mounted on the cam shaft 152 on opposite sides of the cam member 429. It is seen that the collars 452 and 454 which have similarly formed teeth on both ends thereof properly space and lock the cam member 429 to the other cam members that define adjacent cams 284–286 and 292–294, while a similar collar 456 spaces and locks the cam member that defines the cams 280–282 to the cams 284–286. In order to lock all of the cam members to the cam shaft 152, opposed collars 458 and 459 are provided, the collar 458 being formed with wedge-shaped teeth 460 on the inner side thereof that are adapted to engage similarly formed teeth 462 on the outer boss of the cam 280. The collar 458 is further provided with teeth 464 on the outer side thereof that are adapted to engage teeth 466 formed on a flange 468 that is integrally joined to the shaft 152. The ball bearing 154 is secured between the flange 468 and the gear 150, while the gear 150 is secured to the cam shaft 152 by a key 470, and a nut 472 that threadably engages the outer end of the cam shaft 152. The locking collar 459 is mounted on the other end of the cam shaft 152 and has teeth 476 formed thereon that engage similar teeth 478 that extend from a boss 480 of the cam 294, the locking collar 459 being secured from rotation with respect to the cam shaft 152 by a key 482. The ball bearing 156 is interposed between the collar 459 and a nut 486 that is adapted to cooperate with the flange 468 for locking the various cam members, collars, and ball bearings onto the cam shaft 152. The cam members, collars and ball bearings are smoothly bored to snugly fit onto the cam shaft 152, and in the assembly thereof the nuts 472 and 486 are tightened to firmly wedge the members together in abutting relationship so that they cooperate with the cam shaft 152 to act as an integral member therewith. Since the various engaging teeth and notches have tapering sides, the cam members are always maintained in firm engagement with each other and in proper angular relationship, wherein backlash is substantially eliminated and the torque transmitting value is increased. The driving torque is thereby more effectively transmitted to the roller clutch units with a resulting minimum degree of torsional deflections.

In the operation of the transmission 14, it is the configuration of the cams 280–294 that determines the movement of the working beams, and, therefore, the cam configuration is an important consideration in the design of the device. As best shown in FIG. 25, the configuration of the cam 290, which is representative of the other cams, is the same on opposite sides of the median plane denoted by the line M–M¹. As the cam rotates counterclockwise as viewed in FIG. 25, the input end of the working beam 276 is lowered and raised between its maximum upper and lower positions, which are determined by the dwell surfaces D1 and D2 formed on the cam 290. During one-half cycle of the cam shaft 152, the lower cam rollers 340 and 342 move from the dwell surface D1 and carry the input end of the working beam downwardly as they roll over the surfaces indicated at $HA_1$, $U_1$ and $HD_1$ and onto the dwell surface D2. At the same time, the upper cam rollers 362 and 364 move from the dwell surface D2 and roll over the surfaces indicated at $HD_2$, $U_2$ and $HA_2$, respectively, and onto the dwell surface D1. During the next half cycle, the upper cam rollers 362, 364 move from the dwell surface D1 and carry the input end of the working beam upwardly as they roll over the surfaces $HA_1$, $U_1$ and $HD_1$ and onto the dwell surface D2. At the same time, the lower cam rollers 340, 342 move from the dwell surface D2 and roll over the surfaces $HD_2$, $U_2$ and $HA_2$, respectively, and onto the dwell surface D1. In the design of the cams, the surfaces $U_1$ and $U_2$ are shaped to impart uniform motion in opposite directions to the clutch lever 410 of each one-way clutch and for each cycle of the cam. The surfaces $U_1$ and $U_2$ represent the period for the actual stroke of each clutch lever and as illustrated overlapping the ratio stroke surfaces represented by RS1 and RS2. Surfaces RS1 and RS2 define the normal stroke of each lever or 90° rotation of the output shaft, the difference between $U_1$ and RS1 and $U_2$ and RS2 representing an overlap stroke. The surfaces $HA_1$ and $HA_2$ are designed to transmit uniformly accelerated harmonic motion to the cam rollers while moving the mass up to the required speed, while the cam surfaces $HD_1$ and $HD_2$ are designed to transmit uniformly decelerated harmonic motion to the cam rollers, thereby insuring that the mass will follow the prescribed path to produce a positive motion. Since the four pairs of cams are angularly displaced from one another on the shaft 152 at 0°, 90°, 180° and 270°, as the cam surfaces $U_1$ and $U_2$ of the respective cams extend through an arc of at least 90°, one or another of the four clutches is acting to transmit power to the shaft 48 throughout each cycle of the cam shaft 152. As described above, it is preferable to have the arcs of the uniform motion surfaces of the several cams exceed 90° so as to have the driving effort of successively actuating cams overlap one another. By employing the cam design as illustrated and described, a more positive motion of the output shaft is insured and the input shaft may further be rotated in either direction to produce the same output.

*The Reversing Unit and Holdback Mechanism*

As illustrated in FIG. 1 and described above, the transmission embodied herein is designed primarily for use in driving an automotive vehicle. It is contemplated, however, to connect the output shaft 48 to various kinds of industrial machines which start at either zero, low or high speeds and operate at gradually increasing or decreasing speeds. Examples of such machines with which the present invention may be employed are heavy drill presses, draw benches for drawing wire or seamless tubing, and winding machines and the like. When the transmission is used for automotive purposes, it is necessary to provide some form of a reversing mechanism as well as a means for braking the main shaft. As described above in connection with FIG. 1, a reversing unit 18 is provided for reversing rotation of the output shaft 48, while a braking or hold-back mechanism 20 is operatively connected to the reversing unit and provides a means for braking the output shaft 48 without affecting the transmission control means.

Referring now to FIGS. 2, 3, 26 and 27, the reversing unit 18 and hold-back mechanism 20 are illustrated in more detail, the output shaft 48 being adapted to drive a secondary or jack shaft 490 in reverse directions as desired, the jack shaft 490 being connectable to the differential 22 (FIG. 1) for driving axles 24 of an automotive vehicle. As shown in FIGS. 3 and 27, both the reversing unit 18 and hold-back mechanism 20 are mounted in a housing 492 that is connectable directly to the main housing 60. As described above in connection with FIG. 3, the outer end of the output shaft 48 carries the bevel gear 54, the hub of which is splined to the shaft 48 and is journalled in bearing 52. The inner end of the jack shaft 490 is mounted for rotation in a sleeve bearing 494 that is secured in a central opening in the bevel gear 54, while the outer end of the jack shaft is journalled in a sleeve bearing 496 secured within a bevel gear 498. The bevel gear 498 is formed with a hub 500 that surrounds the jack shaft 490 and is mounted in a bearing 502, the bearing 502 being secured in a boss 504 formed in the housing 492. Rings 506 and 508 are snapped in grooves in the boss 504 and hub 500, respectively, and are adapted to prevent endwise movement of the bearing 502 and the bevel gear 498. Engaging the bevel gears 54 and 498 in continuous meshing relation is a central bevel gear 510 that is secured to a shaft 512 for rotation therewith, the shaft 512 being journalled in a bearing 514 that is carried by a central portion 516 of the housing 492.

In order to reverse the direction of rotation of the shaft 490, a clutch collar 518 is provided that is formed with oppositely disposed clutch teeth 520 and 522. Clutch teeth 520 are adapted to engage clutch teeth 524 formed on the adjacent end of the bevel gear 54, while the clutch teeth 522 are adapted to be engaged with clutch teeth 526 formed on the adjacent end of the bevel gear 498. An annular groove 528 is formed intermediate the clutch collar 518 for receiving clutch shoes 530 mounted in the ends of a yoke 532, the yoke 532 being connected to a clutch lever 534. The clutch lever 534 is fastened to a control shaft 536 that is mounted in suitable bearings located in the housing 492. The clutch collar 518 is splined to the shaft 490 at 538 and is slidable in response to movement of the control shaft 536 to engage either the bevel gear 54 or the bevel gear 498. When the jack shaft 490 is to be rotated in a forward or normal direction, the clutch collar 518 is moved inwardly, as seen in FIG. 30, thereby directly connecting the bevel gear 54 to the jack shaft 490 through the clutch collar. In order to reverse rotation of the jack shaft 490, the clutch collar 518 is moved outwardly, as seen in FIG. 30, wherein the bevel gear 54 drives the clutch collar and jack shaft through the bevel gear 510 and the bevel gear 498. It is also seen that by placing the clutch collar 518 in the neutral position as shown in FIG. 27, the transmission mechanism is released.

On occasions, it may be desirable to brake the jack shaft 490, and this may be accomplished by applying a restraining torque thereon by means of an external control. As shown in FIGS. 27 and 28, the braking or holdback mechanism 20 for the jack shaft 490 includes a pair of oppositely disposed cup-shaped members 540 and 542 that surround a reduced portion of the shaft 512 and that are formed with opposed hubs 544 and 546. Extending through the hubs 544 and 546 of each member and in bearing relation are pivot pins 548 and 550, respectively. The outer ends of the pivot pins 548 and 550 are carried by bearings 552 and 554, respectively, the bearings 552, 554 being integrally formed on the end of a yoke 556. The yoke 556 of both the members 540 and 542 is pivotally mounted on a fulcrum pin 558 that is journalled in the housing 492. Lever arms 560 are joined to each yoke 556 and are spaced apart to receive a spring 562 therebetween that urges the members 540 and 542 toward each other. Enclosed in the cup-shaped member 540 are a series of friction discs 564 that are formed with notches in their outer peripheries, each of the notches engaging splines formed on the interior of the member 540. The discs 564 are interleaved with similar discs 566 having notches that are engaged by splines that are formed on the shaft 512. A similarly arranged set of interleaved discs are contained within the member 542, and the two sets of discs are separated by a washer 568. It is seen that during a braking action the interleaved friction discs are compressed by the movements of the yokes 556 toward each other due to the force exerted by the spring 562 and thereby exert a retarding force on the shaft 512. In order to relieve the braking effort transmitted through the discs of the members 540, 542 by the force of the spring 562, spaced pairs of rollers 570 and 572 are provided and are mounted on pins 573 and 574, respectively, that are in turn joined to the bearings 552 and 554, respectively, of the yokes 556. Cams 578 and 580 are mounted in spaced relation on a shaft 582, each cam being adapted to engage the adjacent rollers 570 or 572. The shaft 582 is journalled for rotation in the housing 492 and extends outwardly thereof at 584 to provide an external control for the braking mechanism. A spacer 586 is mounted on the shaft 582 and acts to properly space the cams 578 and 580 thereon. The cams 578 and 580 are shaped so as to vary the braking effect on the shaft 512 between zero and the maximum force of the spring 562 as the shaft 582 is rotated through an angle of 90°, and it is seen that since the shaft 512 is directly connected to the bevel gear 510, any retarding force impressed on the shaft 512 by the spring 562 will also affect the operation of the jack shaft 490.

*Operation*

In describing the operaiton of the invention embodied herein, it is first assumed that the clutch unit 30 is in the neutral position, as seen in FIG. 13, and that the power being delivered to the output shaft 48 is zero. In this event, the reduced end of the follower member 188 is located in the shallow notch 194 and the slide 226 is located at the outermost position thereof. When it is desired to control the rotaton of the output shaft the fluid motor 196 is operated by introducing operating fluid therein through port 214 and into contact with the vane 212. This causes the shaft 187 connected to the vane to be rotated counterclockwise as seen in FIG. 2, thereby producing a corresponding rotation of the segment cam 183 and control cam 218. Rotation of the segment cam 183 causes the follower member 188 to ride on the peripheral surface thereof, wherein the shift rod 174 is moved to the left as seen in FIG. 2. Movement of the shift rod 174 in this direction from the neutral position thereof then causes the control lever 102 to move the clutch collar 88 to the right, whereupon the gear 130 is clutched to the clutch collar 88 by the interengaging clutch teeth 143 and 94. As the clutch collar 88 moves to the right, as seen in FIG. 8, it carries the clutch element 108 therewith which is clutched to the hollow shaft 49 through the meshing clutch teeth 110 and 126. The output shaft 48 is now interengaged to the hollow shaft 49 through the clutch element 108, and the transmission drive gear 130 is located in driving relation with the cam shaft gear 152. In the drive to the transmission drive gear 130 the clutch collar 88 is normally rotated by the differential drive 28 through the friction clutch and its housing 70, sun gear 68, planetary gears 62, 64, carrier 46, driving dog 32 and the power shaft 34. With the output shaft stationary, the sun gear 66 connected directly thereto will also remain stationary. However, as soon as the clutch unit 30 clutches the clutch collar 88 into engagement with the gear 130 which acts to drive the transmission cam shaft 152, the output shaft 48 will begin rotating together with the sun gear 66. Since the sun gears 66 and 68 have a 1:1 ratio, one half the power imparted to the output shaft 48 is delivered thereto by the transmission unit 14 and one half by the power source as represented by the power shaft 34, driving dog 32, planetary gears 62, 64 and sun gear 66. With the transmission unit 14 clutched to the power source, the drive to the output shaft 48 is brought about by the rotation of the cam shaft 152 and the cam members mounted thereon for rotation therewith. Each cam member is located in phased relation to the other cam members so as to effect a driving torque for at least 90° rotation of the output shaft, the cam followers 340, 342 and 362, 364 being controlled to produce an oscillating motion of their respective working beams. Since the working beams are connected directly to the one-way roller drive clutch units 144, 146 oscillating movement will be applied thereto. The driving motion of each roller drive clutch unit is then applied to the hollow shaft 49, and since the hollow shaft 49 is interconnected to the output shaft 48 through the clutch element 108, the driving motion of the roller drive clutch units will be applied thereto.

In order to infinitely vary the rotational speed of the output shaft 48 the fluid motor 196 is controlled as indicated above which movement also rotates the control cam 218. Rotation of the control cam 218 shifts the slide 226 inwardly together with the cross bar 246 to which the cross heads 260 and 262 are operatively connected. As the cross heads 260 and 262 are shifted, the fulcrum points for the working beams are moved which, in effect, changes the operating stroke of the several working beams. Varying the operating stroke of the working beams will produce a corresponding change in the oscillating motion of the one-way roller drive clutches, wherein the torque applied to the hollow shaft and the interconnected output shaft 48 will be varied accordingly. Since the fulcrum points of the working beams may be moved to an infinite number of positions the speed of the output shaft may be infinitely varied, and the speed required may be easily obtained by the simple rotation of the shaft 187. It is understood that the transmission unit is delivering power to the output shaft at all times that the gear 130 is clutched to the clutch collar 88 and this is represented by the location of the follower element 188 on the periphery of the segment cam 183. When the follower element is moved into the shallow notch 194 upon rotation of the vane motor and shaft 187, the clutch collar 88 is moved to the neutral position, thereby disengaging the transmission unit from the power source. However, when the speed of the output shaft approaches the speed of the power shaft 34, the segment cam has been rotated to the position where the follower element engages the deep notch 192. In this position, the control lever 102 is moved to the extreme left as seen in FIG. 2, causing the clutch teeth 92 of the clutch collar 88 to engage the clutch teeth 107 of clutch element 104. Since the clutch element 104 is connected to the output shaft 48, the output shaft is now connected directly to the power shaft 34 and driven at the same speed thereof.

The rotation of the jack shaft 490 may be reversed by rotating the control shaft 536 counter clockwise as seen in FIG. 26, normal rotation of the jack shaft being effected when the clutch collar is moved inwardly or upwardly as seen in FIG. 27, thereby connecting the auxiliary or jack shaft 490 to the output shaft through the clutch collar 518 and gear 54. A retarding action may also be impressed on the jack shaft by the hold back mechanism 20 by rotating the shaft 582 so as to cause the friction discs 564 and 566 to be compressed into engaging relation with each other.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a power transmission, a power input shaft, an output shaft coaxial with said input shaft for delivering power from said input shaft, an auxiliary shaft and parallel with respect thereto spaced from said output shaft, means for selectively interengaging said auxiliary shaft with said power input shaft, clutch means operatively interconnected to said output shaft and responsive to rotation of said auxiliary shaft for transferring the drive from said auxiliary shaft to said output shaft, means carried by said auxiliary shaft for controlling the operation of said clutch means for varying the power input to said output shaft, means operatively interconnected to said output shaft for reversing the direction thereof and means operatively interconnected to said output shaft for producing a braking action thereon as required.

2. In a power transmission, a power input shaft, a differential gear train operatively engaging said input shaft and responsive to rotation thereof, an output shaft for delivering power from said input shaft, an auxiliary shaft spaced from said output shaft, a clutch assembly for selectively interengaging said input shaft to said output shaft or to said auxiliary shaft, means for controlling the operation of said clutch assembly, a plurality of cam members mounted on said auxiliary shaft for rotation therewith, working beams mounted for pivotal movement and responsive to rotation of said cam members to produce an oscillating motion, and clutch means operatively connected to said working beams and oscillated thereby, said clutch means translating the oscillating movement thereof into rotary motion of said output shaft and means responsive to operation of said controlling means for adjusting the pivot position of said working beams, thereby controlling the oscillating movement of said clutch means and corresponding rotation of said output shaft.

3. In a power transmission as set forth in claim 2, said controlling means for said clutch assembly including a segment cam that is adapted to be rotated between limits defined by notches formed on opposite sides of the segmental portion of said cam, a follower member engaging said cam and adapted to be reciprocated in response to movement thereof to the limit positions defined by said notches, and a pivotally mounted lever interconnected to said follower member on one end thereof and to said clutch assembly on the other end thereof for translating the movement of said follower member into operation of said clutch assembly.

4. In a power transmission as set forth in claim 3, said segment cam being operatively connected to motor means and being responsive to controlled rotation thereof, wherein the desired rotation of said segment cam is produced so as to actuate said clutch assembly in a predetermined direction.

5. In a mechanical power transmission, a power shaft, an output shaft for delivering power derived from said power shaft, a cam shaft, gearing including a gear surrounding said output shaft and located in driving connection with a gear fixed to said cam shaft, a plurality of cam members mounted on said cam shaft for rotation therewith, separately movable oscillating levers driven by said cam members, a plurality of overrunning clutches operatively interconnecting said levers and said output shaft and translating the oscillating motion of said levers into rotary motion of said output shaft, differential gearing interposed intermediate said power shaft and said output shaft, said differential gearing including one member driven by said power shaft, a second member connected to said output shaft, and a third member mounted for rotation on said output shaft with respect thereto, a clutch unit driven by said third member for delivering power from said differential gearing to said cam shaft, said clutch unit including a shiftable member rotatable by said third member and shiftable into engagement with said rotatable gear surrounding said output shaft for rotating on said cam shaft so that when said shiftable member is in engagement with said rotatable gear, said output shaft is rotated by power transmitted through said differential gearing in part directly to said output shaft and in part through said cam shaft, oscillating levers and overrunning clutches.

6. In a mechanical power transmission as set forth in claim 5, said third member including a sun gear and a friction disc clutch assembly that is operatively interconnected to said shiftable member for imparting the rotation thereto, said friction disc clutch assembly being adapted to protect said differential gearing in the event of unexpected shocks exerted on said output shaft.

7. In a mechanical power transmission as set forth in claim 5, a plurality of cam followers that are movable in response to rotation of said cam members, means for guiding the movement of said cam followers, said levers being operatively interconnected to said cam followers and being pivotally mounted so that movement of said cam followers produces a corresponding oscillating movement of said levers, and means for adjusting the pivot connection of said levers thereby adjusting the stroke of the oscillating movement thereof, the speed of said output shaft being varied accordingly.

8. In a mechanical power transmission as set forth in claim 5, a hollow shaft surrounding said output shaft and carrying said overrunning clutches thereon, said hollow shaft having a plurality of clutch teeth formed thereon at one end thereof, a clutch member defining an element of said clutch unit being secured to said output shaft for rotation therewith and being axially shiftable thereon, clutch teeth formed on said clutch member for engaging the clutch teeth on said hollow shaft, wherein said hollow shaft is drivingly interconnected to said output shaft.

9. In a power transmission, a power shaft operatively connected to a source of power, an output shaft operatively connected to a driven member and being adapted to deliver power to said driven member that is derived from said power shaft, a cam shaft having a plurality of cams mounted thereon in spaced predetermined angular relation, a plurality of overrunning clutches operatively interconnected to said output shaft and responsive to rotation of said cams for driving said output shaft at a predetermined speed, a differential drive interposed intermediate said power shaft and said output shaft and including a first member that is operatively connected to said power shaft and driven thereby, a second member operatively connected to said output shaft and a third member mounted on said output shaft for rotation with respect thereto, a clutch unit operatively interconnected to said third member and being adapted to selectively engage said third member either directly with said output shaft or with said cam shaft wherein said cam shaft operatively drives said overrunning clutches for effectively driving said output shaft at a predetermined speed, said cam shaft and the second member of said differential drive thereby being adapted to jointly drive said output shaft.

10. In a variable speed transmission, a power shaft operatively connected to a source of power, an output shaft for driving a driven member, a cam shaft spaced from said output shaft and being adapted to impart driving rotation thereto, means interconnecting said cam shaft to said output shaft for transferring the driving power of said cam shaft to said output shaft, means for controlling the operation of said interconnecting means wherein the rotational speed of said output shaft is varied between zero speed and a maximum speed that is equal to the speed of said power shaft, a differential drive interposed between said power shaft and said output shaft, a clutch unit operatively interconnected to said differential drive and responsive to said control means for selectively interengaging said output shaft directly to said power shaft or said cam shaft to said power shaft.

11. In a variable speed transmission as set forth in claim 10, said controlling means including a plurality of oscillating levers and a plurality of overrunning clutches interconnected to said levers, means for adjusting the fulcrum point of said levers thereby varying the oscillating stroke thereof, and means responsive to rotation of said cam shaft for oscillating said levers.

12. In a variable speed transmission as set forth in claim 11, said adjusting means including at least one cross head operatively engaging said levers and adjustable within a predetermined limit in a direction that is perpendicular to the axis of said power shaft to adjust the fulcrum point of said levers, a control cam formed with a predetermined contour, and a slide construction operatively interconnected to said cross head and responsive to rotation of said cam for producing a corresponding movement of said cross head.

13. In a variable speed transmission, a power shaft connected to a source of power, an output shaft connected to an output source, a differential drive disposed between said power shaft and said output shaft, a transmission unit for driving said output shaft at a selected speed between zero and the speed of said power shaft, means for operatively interconnecting said transmission to said differential drive, and means for controlling said interconnecting means, whereby said power shaft is connected directly to output shaft or to said transmission unit through said differential drive, said controlling means further simultaneously controlling the operation of said transmission unit wherein said output shaft is operated at the speed selected therefor.

14. In a variable speed transmission as set forth in claim 13, means operatively interconnected to said output shaft for reversing the output thereof, and means operatively interconnected to said reversing means for braking said output shaft.

15. In a variable speed transmission, a power shaft, an output shaft, a differential drive disposed between said power shaft and said output shaft, a transmission unit including a cam shaft that is adapted to be driven by said power shaft through said differential drive and that is adapted to drive said output shaft at a selected speed between zero and the speed of said power shaft, a plurality of cam members mounted on said cam shaft for rotation therewith, a plurality of pivotally mounted working beams responsive to rotation of said cam members, a plurality of one-way roller clutch units operatively interconnected to said output shaft in driving relation therewith and to said working beams, and means for adjusting the pivot connection of said working beams for varying the effective working movement thereof whereby the effective rotational speed of said output shaft is infinitely varied.

16. In a variable speed transmission and drive therefor, a power shaft, an output shaft, a differential drive interposed between said power shaft and said output shaft, a cam shaft spaced from said output shaft and adapted to be driven by said power shaft through said differential drive, a clutch unit mounted on said output shaft and operatively interconnected to said differential drive, means for actuating said clutch unit for connecting said differential drive in driving relation with said cam shaft, and means for controlling the operation of said actuating means, said actuating means being movable by said control means to a first position wherein said clutch unit is connected directly to said output shaft and the speed of said output shaft is equal to the speed of said power shaft, to a second position wherein said actuating means is located in a neutral position so that said clutch unit is inoperative and said output shaft is deactivated, and to a third position wherein said cam shaft is interconnected to said power shaft through said clutch unit and differential drive and operative to impart a predetermined speed to said output shaft as determined by the specific location of said actuating means in said third position.

17. In a variable speed transmission as set forth in claim 16, said controlling means including a segment cam having opposed notches formed therein, one of said notches being more deeply cut in said cam than the other, a follower member engaging said segment cam, a lever assembly operatively connected to said follower member and to said clutch unit, said segment cam being rotatable to locate said follower member on the segment portion thereof or in one of said notches, the more deeply cut notch defining said first position, said other notch deining the neutral position, and the segment portion of said cam defining said third position.

18. In a variable speed transmission, and drive therefor, a power shaft, an output shaft, a differential drive interposed between said power shaft and said output shaft, a cam shaft spaced from said output shaft, and adapted to impart a controlled driving motion thereto, means for selectively clutching said differential drive either directly to said output shaft or through gearing to said cam shaft means for actuating said clutching means, and means responsive to the position of said actuating means for infinitely controlling the speed of said output shaft.

19. In a variable speed transmission and drive therefor, a power shaft, an output shaft, a cam shaft spaced from said output shaft and adapted to impart a controlled driving motion thereto, means for selectively interengaging said power shaft either directly to said output shaft or to said cam shaft, means for actuating said interengaging means, and means interconnected to said actuating means and responsive to the position thereof for infinitely controlling the speed of said output shaft.

20. In a variable speed transmission and drive therefor, a power shaft, an output shaft, a cam shaft spaced from said output shaft and adapted to impart a controlled driving motion thereto, means for selectively interengaging said power shaft either directly to said output shaft or to said cam shaft, means for actuating said interengaging means, means interconnected to said actuating means and responsive to the position thereof for infinitely controlling the speed of said output shaft, means operatively connected to said output shaft for reversing the rotation thereof and means interconnected to said reversing means for imparting a braking action on said output shaft.

21. In a variable speed transmission and drive therefor, a power shaft, an output shaft, a cam shaft spaced from said output shaft and adapted to impart a controlled driving motion thereto, a differential drive interposed between said power shaft and said output shaft and including a first member that is operatively connected to said power shaft and driven thereby, a second member operatively connected to said output shaft and a third member mounted on said output shaft for rotation with respect thereto, means for selectively interengaging said third member to either said output shaft or to said cam shaft and means interconnected to said interengaging means and responsive to the position thereof for infinitely controlling the speed of said output shaft.

22. In a variable speed transmission as set forth in claim 21 said control means including a control cam, followers engaging said control cam and movable in response to rotation thereof, a slide secured to said followers and movable therewith as the control cam is rotated, a cross head interconnected to said slide for movement therewith and carrying at least two levers that are mounted for oscillating movement therein, overrunning clutches surrounding said output shaft and operatively interconnected thereto, said levers being oscillated in response to rotation of said cam shaft to produce a corresponding oscillating motion in said overrunning clutches, said overrunning clutches translating said oscillating motion into rotary movement of said output shaft.

23. In a variable speed transmission and drive therefor, a power shaft, an output shaft, a transmission unit adapted to impart a controlled driving motion to said output shaft, a differential drive interposed between said power shaft and said output shaft, a clutching unit operatively connected to said differential drive and operable to selectively connect said power shaft to said output shaft through said differential or to connect said transmission unit with said power shaft through said differential, means for actuating said clutching unit, and means interconnected to said actuating means and responsive to the position thereof for infinitely controlling the speed of said output shaft.

24. In a variable speed transmission and drive therefor, a power shaft, an output shaft, a cam shaft spaced from said output shaft and adapted to impart a controlled driving motion thereto, means for operatively interconnecting said cam shaft to said power shaft, a plurality of cam members mounted on said cam shaft for rotation therewith, a plurality of pivotally mounted working beams that are oscillated in response to the rotation of said cam members, a plurality of one-way roller clutches surrounding said output shaft in coaxial relation with respect thereto and operatively connected to said working beams, said roller clutches being adapted to translate the oscillating movement of said working beams into rotary motion of said output shaft, and means for infinitely adjusting the fulcrum point of said working beams whereby the speed of said output shaft is adjusted a corresponding amount.

25. In a variable speed transmission as set forth in claim 24, said adjusting means including slidable cross heads that carry said working beams therein and define fulcrums therefor, a slide construction operatively interconnected to said cross heads for imparting the sliding movement thereto, a control cam that is rotatable to produce a predetermined movement of said slide construction, and external control means for rotating said control cam in accordance with the desired speed of said output shaft.

26. In a variable speed transmission and drive therefor, a power shaft, an output shaft, a cam shaft spaced from said output shaft and adapted to impart a controlled driving motion thereto, and a differential drive interposed between said power shaft and said output shaft and including a sun gear that is freely mounted on said output shaft relative thereto, a friction clutch having a housing that is joined to said sun gear, said friction clutch surrounding a clutch collar that is mounted coaxially with respect to said output shaft and axially movable relative thereto, said friction clutch being operatively connected to said clutch collar and transferring rotary motion of said sun gear to said clutch collar, a clutch member fixed to said output shaft and adapted to be selectively engaged by said clutch collar for coupling said output shaft in direct drive with respect to said power shaft, and a gear member directly coupled to said cam shaft and adapted to be selectively engaged by said clutch collar for operatively interconnecting said cam shaft to said power shaft.

27. In a drive for a variable speed transmission, a power shaft, an output shaft adapted to derive driving motion from said power shaft, a differential drive interposed between said power shaft and said output shaft and including a first member that is operatively connected to said power shaft and driven thereby, a second member operatively connected to said output shaft, and a third member mounted freely on said output shaft for rotation with respect thereto, a first clutch unit operatively connected to said third member and including a sleeve, and a second clutch unit mounted on said output shaft interiorly of said first clutch unit and including a shiftable clutch collar, said clutch collar being operatively interconnected to said sleeve and driven thereby, and means for selectively shifting said clutch collar to a first position wherein said output shaft is directly coupled to said power shaft through said first clutch unit and said differential drive, or to a second position wherein the rotational speed of said output shaft is controlled between zero and the speed of said power shaft.

28. In a variable speed transmission and drive therefor, a power shaft, an output shaft having a hollow shaft mounted thereon for rotation with respect thereto, a clutch unit including a shiftable clutch collar, a first clutch element that is secured directly to said output shaft and a second clutch element that is slidably secured to said output shaft and is adapted to be coupled to said hollow shaft, a cam shaft spaced from said output shaft, a driving member adapted to be coupled to said clutch collar and operatively connected to said cam shaft for imparting rotation thereto, a plurality of cam members mounted on said cam shaft for rotation therewith, a plurality of one-way roller clutches secured to said hollow shaft, a plurality of pivotally mounted working beams operatively connected to said roller clutches and responsive to rotation of said cam members to impart an oscillating movement to said roller clutches, said roller clutches translating said oscillating movement into rotary movement of said hollow shaft, said hollow shaft driving said output shaft through said second clutch element, and means for selectively engaging said clutch collar in driving relation with said driving member.

29. In a variable speed transmission, an output shaft, a plurality of one-way roller drive clutches surrounding said output shaft and operatively connected thereto, a cam shaft, means for driving said cam shaft, a plurality of cam members mounted on said cam shaft for rotation therewith, a plurality of cam followers engaging said cam members and constrained for movement in a linear direction in response to rotation of said cam members, means associated with said cam followers for imparting the linear movement thereto, a plurality of working beams operatively connected to said imparting means and pivotally connected to said roller drive clutches, each of said working beams having a fulcrum connection the position of which determines the length of stroke of the connection between said working beams and said roller drive clutches and thereby determines the amount of oscillating movement of said roller drive clutches in response to the pivoting action of said working beams, and means for adjusting the position of said fulcrum connections for varying the rotational speed of said output shaft.

30. In a variable speed transmission, a four-phase structure including at least four one-way roller drive clutches that are operatively connected to an output shaft and are each adapted to impart a driving torque to said shaft during at least one quarter of a revolution thereof, a cam shaft spaced from said output shaft, means for driving said cam shaft, at least four cam members mounted on said cam shaft in spaced relation, each of said cam members being associated with a roller drive clutch and having a predetermined configuration so that as said cam shaft is rotated each cam member causes a sequential operation of its associated roller drive clutch thereby providing for continuous rotary movement of said output shaft.

31. In a variable speed transmission and drive therefor, a power shaft, an output shaft, a cam shaft spaced from said output shaft, a clutching unit for operatively interconnecting said cam shaft to said power shaft, a plurality of cam members mounted on said cam shaft for rotation therewith, a plurality of working beams having fulcrum points and responsive to the rotation of said members for producing a controlled oscillating movement, a plurality of one-way roller clutches surrounding said output shaft in coaxial relation with respect thereto and operatively connected to said working beams, and means for simultaneously controlling the operation of said clutching unit and changing the fulcrum point of said working beams thereby infinitely controlling the speed of said output shaft, said controlling means including a control shaft, a fluid operated vane motor mounted on said control shaft, a segment cam mounted on said control shaft in spaced relation with respect to said vane motor and controlling the operation of said clutching unit, and a cam and slide assembly interconnected to said control shaft and responsive to the rotation of said control shaft for controlling the position of the fulcrum points of said working beams, wherein the oscillating movement of said one-way roller clutches is controlled to exert a corresponding control on the rotational speed of said output shaft.

32. In a variable speed transmission as set forth in claim 31, opposed cam followers engaging said cam members and responsive to the rotation thereof to produce a predetermined movement, rollers interconnected to said cam followers, means for guiding said rollers so that upon movement of said cam followers by said cam members they will follow a predetermined path, links interconnecting said opposed cam followers, and said working beams being interconnected to said cam followers, wherein movement of said cam followers through said controlled path will produce a corresponding oscillating movement of said working beams.

33. In a variable speed transmission, a four-phase structure including at least four one-way roller drive clutches that are operatively connected to an output shaft and are each adapted to impart a driving torque to said output shaft during at least one quarter of a revolution thereof, a cam shaft spaced from said output shaft, means for driving said cam shaft, at least four cam members mounted on said cam shaft in spaced axial relation, a plurality of working beams each of which is responsive to movement of one of said cam members to produce an oscillating movement, each of said working beams being operatively connected to a roller drive clutch for imparting an oscillating movement thereto, means for adjusting the stroke of said working beams thereby varying the oscillating movement of said roller drive clutches and the rotational speed of said output shaft, each of said cams having a predetermined configuration and being angularly spaced on said cam shaft so that upon continuous rotation of said cam shaft a sequential oscillating movement of said working beams and associated roller drive clutches will be produced to provide for a continuous rotary movement of said output shaft.

34. In a variable speed transmission as set forth in claim 33, said adjusting means including cross members that carry said working beams and define the fulcrums therefor, a slide element operatively connected to said cross members and adapted to be actuated within controlled limits for producing a corresponding movement thereof whereby the fulcrum points of said working beams are adjusted, the oscillating movement of said roller drive clutches thereby being adjusted to infinitely vary the rotational speed of said output shaft, and means for controlling the movement of said slide element.

35. In a variable speed transmission a power shaft, a differential drive, an output shaft connected directly to said input shaft through said differential drive, a transmission unit adapted to be operatively interconnected to said power shaft through said differential drive and controlling the rotational speed of said output shaft, whereby the drive to said output shaft may be supplied in part directly from said power shaft and in part through said transmission unit, a reversing mechanism for reversing the rotation of said output shaft, said reversing mechanism including a first bevel gear secured to the end of said output shaft and having clutch teeth formed thereon, a second intermediate bevel gear engaging said first bevel gear and adapted to be continuously rotated thereby, a third bevel gear mounted on a secondary shaft that has one end thereof journalled within said first bevel gear and the other end free for securement to a driven member, said third bevel gear having clutch teeth formed thereon facing in the direction of the clutch teeth on said first bevel gear, an axial movable clutch member secured to said secondary shaft for rotation therewith between said first and third bevel gears and having opposed clutch teeth formed thereon, and means for selectively shifting said clutch member in an axial direction to engage a set of said clutch teeth with the clutch teeth of an adjacent bevel gear, the engagement of the clutch teeth of said clutch member with said first bevel gear producing a direct drive to said auxiliary shaft and the engagement of the opposed set of clutch teeth on said clutch member with the clutch teeth of said third bevel gear causing said third bevel gear to be driven through said intermediate bevel gear thereby reversing the rotation of said auxiliary shaft with respect to said output shaft.

36. In a variable speed transmission, a power shaft, an output shaft, a transmission unit adapted to be operatively interconnected to said power shaft and controlling the rotational speed of said output shaft, a braking mechanism for retarding the rotation of said output shaft, said braking mechanism including a braking shaft that is operatively connected to said output shaft, a pair of members pivotally mounted on said braking shaft and having a plurality of friction discs positioned therein and engaging said braking shaft, spring means engaging said members and normally urging said members in a direction to compress said friction discs, wherein a retarding action is exerted on said braking shaft by said friction discs, said braking shaft thereby exerting a corresponding retarding action on said output shaft, and control means operatively interconnected to said members for causing a separating movement therebetween against the action of said spring, thereby removing the braking action exerted on said braking shaft by said friction discs.

37. In a variable speed transmission, a cam assembly comprising an elongated cam shaft, a plurality of cam members mounted on said cam shaft in spaced axial relation and in spaced angular relation, each of said cam members having opposed hub portions which are formed with wedge shaped teeth, intermediate collars positioned on said cam shaft between said cam members and formed with complementary wedge shaped teeth that engage the teeth formed on the hub portions of said cam members, and locking collars secured to said cam shaft adjacent both ends thereof and including wedge shaped teeth for engaging the teeth of the adjacent cam members, the interaction of the hub portions, intermediate collars and end locking collars securely mounting said cam members in position and preventing backlash during the operation of said transmission.

38. In a variable speed transmission, a cam assembly including an elongated cam shaft, a plurality of cam members mounted on said cam shaft in spaced axial relation and in spaced angular relation, each of said cam members having hub portions that are formed with tapered clutch teeth on opposed ends thereof, collars mounted on said cam shaft intermediate said cam members and having tapered clutch teeth formed on the ends thereof that are adapted to mesh with the tapered clutch teeth on the adjacent cam members, and means secured to said cam shaft and engaging said collars for interlocking said cam members and said collars together as a unit on said cam shaft, said cam members thereby being free of backlash when rotated in engagement with associated cam followers during the operation of said transmission.

39. In an assembly for locking a member on a rotatable shaft, said member including a hub portion that surrounds said shaft and that is formed with wedge shaped teeth on at least one end thereof, a second member surrounding said shaft having wedge shaped teeth formed thereon that mesh with the teeth located on said one end of the hub portion of said first named member, and said shaft and interengaging said second member for interlocking said first-named member to said shaft for rotation therewith.

40. In a mechanical power transmission, a power shaft, an output shaft for delivering power derived from said power shaft, a transmission unit operatively interconnected to said output shaft for infinitely varying the speed thereof, a differential drive drivingly connected to said power shaft, and means for operatively interconnecting said differential drive to said transmission unit, said differential drive including a first member that is driven by said power shaft and a second member that is connectable to said transmission unit by said interconnecting means, and a third member connected directly to said output shaft, wherein said output shaft is rotated by power transmitted through said differential drive, in part directly to said output shaft and in part through said transmission unit.

41. In a mechanical power transmission, a power shaft, an output shaft for delivering power derived from said power shaft, a transmission unit operatively interconnected to said output shaft for infinitely varying the speed thereof, and a differential drive including a first member that is connected directly to said power shaft and a second member that is adapted to be simultaneously operatively interconnected to said transmission unit, wherein said output shaft is rotated in part by power transmitted directly thereto through said differential drive and in part by power transmitted through said transmission unit that is interconnected to said differential drive.

42. In a mechanical power transmission, a power shaft, an output shaft for delivering power derived from said power shaft, a transmission unit operatively interconnected to said output shaft for infinitely varying the speed thereof, a differential drive including a first member that is directly connected to said power shaft, a second member connected to said first member and to said output channel, and a third member connected to said first member and to a clutch unit, and means for operating said clutch unit for inter-connecting said third member to said transmission unit so that said output shaft is rotated in part by power transmitted directly thereto through said second member, and in part by power transmitted through said transmission unit that is interconnected to said third member.

References Cited in the file of this patent

UNITED STATES PATENTS

| | | |
|---|---|---|
| 1,344,606 | Wappat | June 22, 1920 |
| 2,047,792 | McFarlane | July 14, 1936 |
| 2,376,429 | Harry | May 22, 1945 |
| 2,585,216 | Bickel et al. | Feb. 12, 1952 |
| 2,585,217 | Bickel et al. | Feb. 12, 1952 |
| 2,682,785 | Cerutti et al. | July 6, 1954 |
| 2,816,458 | Castrow | Dec. 17, 1957 |
| 2,943,505 | Parks | July 5, 1960 |
| 3,004,440 | Pernik | Oct. 17, 1961 |

FOREIGN PATENTS

| | | |
|---|---|---|
| 854,453 | Germany | Nov. 4, 1952 |